United States Patent
Li et al.

(10) Patent No.: US 10,623,077 B2
(45) Date of Patent: *Apr. 14, 2020

(54) WIRELESS COMMUNICATION USING DIFFERENT TYPES OF CYCLIC PREFIXES

(71) Applicant: QUALCOMM Incorporated, San Diego, CA (US)

(72) Inventors: Junyi Li, Chester, NJ (US); Ashwin Sampath, Skillman, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,736

(22) Filed: Apr. 12, 2018

(65) Prior Publication Data

US 2018/0234151 A1 Aug. 16, 2018

Related U.S. Application Data

(63) Continuation of application No. 14/693,624, filed on Apr. 22, 2015, now Pat. No. 9,948,374.

(Continued)

(51) Int. Cl.
*H04W 4/00* (2018.01)
*H04B 7/06* (2006.01)
(Continued)

(52) U.S. Cl.
CPC ......... *H04B 7/0617* (2013.01); *H04L 5/0007* (2013.01); *H04L 5/0028* (2013.01);
(Continued)

(58) Field of Classification Search
CPC . H04B 7/0617; H04B 7/0408; H04L 27/2636; H04L 27/2607; H04L 5/0082;
(Continued)

(56) References Cited

U.S. PATENT DOCUMENTS 9,197,389 B2 11/2015 Jang et al.
2006/0104254 A1 5/2006 Shin et al.
(Continued)

FOREIGN PATENT DOCUMENTS

CN 101345566 A 1/2009
CN 101563859 A 10/2009
(Continued)

OTHER PUBLICATIONS

International Search Report and Written Opinion—PCT/US2015/048699—ISA/EPO—dated Dec. 4, 2015.
(Continued)

*Primary Examiner* — Mang Hang Yeung
(74) *Attorney, Agent, or Firm* — Loza & Loza LLP

(57) ABSTRACT

The disclosure relates in some aspects to communicating different symbols with different types of cyclic prefixes. For example, a first symbol may have a first type of orthogonal frequency-division multiplexing (OFDM) cyclic prefix while a second symbol (e.g., immediately following the first symbol) may have a second type of OFDM cyclic prefix. In scenarios where a cyclic prefix does not include any chips (samples), the beamforming configuration for a transmitter can be changed during the cyclic prefix. At the receiver, the cyclic prefix is reconstructed based on the chips (samples) received during the symbol.

50 Claims, 20 Drawing Sheets

Related U.S. Application Data

(60) Provisional application No. 62/058,513, filed on Oct. 1, 2014.

(51) Int. Cl.
  H04L 27/26 (2006.01)
  H04L 5/00 (2006.01)

(52) U.S. Cl.
  CPC ........ H04L 5/0082 (2013.01); H04L 27/2607 (2013.01); H04L 27/2634 (2013.01); H04L 5/0023 (2013.01); H04L 27/2636 (2013.01)

(58) Field of Classification Search
  CPC . H04L 5/0028; H04L 27/2634; H04L 5/0007; H04L 5/0023
  USPC .......................................................... 370/329
  See application file for complete search history.

(56) References Cited

U.S. PATENT DOCUMENTS

| | | |
|---|---|---|
| 2006/0176966 A1 | 8/2006 | Stewart et al. |
| 2007/0206686 A1 | 9/2007 | Vook et al. |
| 2008/0225791 A1* | 9/2008 | Pi .......................... H04B 7/0417 370/330 |
| 2009/0154532 A1 | 6/2009 | Shin et al. |
| 2009/0160707 A1 | 6/2009 | Lakkis |
| 2009/0279626 A1* | 11/2009 | Wang ................... H04L 1/0025 375/260 |
| 2009/0323563 A1 | 12/2009 | Ho et al. |
| 2010/0118806 A1* | 5/2010 | Griot ................... H04L 27/2607 370/329 |
| 2010/0272203 A1* | 10/2010 | Seyedi-Esfahani ......................... H04L 27/186 375/262 |
| 2012/0281551 A1* | 11/2012 | Alanara ............... H04L 27/2607 370/252 |
| 2013/0022143 A1 | 1/2013 | Ko et al. |
| 2013/0156120 A1 | 6/2013 | Josiam et al. |
| 2013/0315321 A1 | 11/2013 | Rajagopal et al. |
| 2014/0254469 A1* | 9/2014 | Stephens .................. H04B 7/15 370/315 |
| 2015/0282167 A1* | 10/2015 | Lahetkangas ......... H04L 5/0044 370/329 |
| 2016/0020842 A1 | 1/2016 | Li et al. |

FOREIGN PATENT DOCUMENTS

| | | |
|---|---|---|
| JP | 2006115094 A | 4/2006 |
| JP | 2006222956 A | 8/2006 |
| JP | 2013012976 A | 1/2013 |
| JP | 2017502565 A | 1/2017 |
| WO | 2009072171 A1 | 6/2009 |
| WO | 2010056639 A2 | 5/2010 |

OTHER PUBLICATIONS

Khan M.R.R., et al., "Beamforming for Rejection of Co-channels Interference in an OFDM System," Image and Signal Processing (LISP), 2010 3rd International Congress on, IEEE, Piscataway, Nj, USA, Oct. 16, 2010 (Oct. 16, 2010), pp. 3318-3322, XP031809948, ISBN: 978-1-4244-6513-2.

Liu C.Y., et al., "Blind Beamforming Schemes in SC-FDMA Systems with Insufficient Cyclic Prefix and Carrier Frequency Offset," IEEE Transactions on Vehicular Technology, Nov. 2009, vol. 58 (9), pp. 4848-4859.

* cited by examiner

WIRELESS COMMUNICATION USING DIFFERENT TYPES OF CYCLIC PREFIXES

CROSS-REFERENCE TO RELATED APPLICATION(S)

This application is a continuation of non-provisional patent application Ser. No. 14/693,624 filed in the U.S. Patent and Trademark Office on Apr. 22, 2015, and claims priority to and the benefit of provisional patent application No. 62/058,513 filed in the U.S. Patent and Trademark Office on Oct. 1, 2014, the entire content of each of which is incorporated herein by reference.

BACKGROUND

Field of the Disclosure

Aspects of the disclosure relate generally to wireless communication, and more specifically, but not exclusively, to communicating different symbols with different types of cyclic prefixes.

Description of Related Art

In a typical multiple access wireless communication system, several devices communicate with a base station. In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner. That is, the base station transmits to a first device in a first time interval and then to a second device subsequently in a second time interval. Often, the beamforming directions to these two devices are distinct. As a result, the base station may change its beamforming setting from the first time interval to the second time interval. The time for changing the beamforming setting is non-zero because of real-world implementation constraints.

FIG. 1 illustrates a communication system 100 where a base station 102 communicates with a first device 104 and a second device 106 via different beamforming directions. During a first time interval 108 shown in a signaling diagram 118, the base station 102 communicates with the first device 104 via a first beamforming direction 110. During a second time interval 112 shown in the signaling diagram 118, the base station 102 communicates with the second device 106 via a second beamforming direction 114. The illustrated gap for changing the beamforming setting 116 constitutes overhead in the communication system 100. Particularly when analog beamforming is employed, it is desired to mitigate this overhead to improve the performance of the communication system 100.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method of communication for an apparatus. The method includes: receiving a series of consecutive symbols including a first symbol and a second symbol; processing the first symbol based on a first type of cyclic prefix of the first symbol; and processing the second symbol based on a second type of cycle prefix of the second symbol, wherein the second type of cyclic prefix is different from the first type of cyclic prefix.

Another aspect of the disclosure provides an apparatus for communication that includes a receiver and a processing circuit. The receiver is configured to receive a series of consecutive symbols including a first symbol and a second symbol. The processing circuit is configured to: process the first symbol based on a first type of cyclic prefix of the first symbol; and process the second symbol based on a second type of cycle prefix of the second symbol, wherein the second type of cyclic prefix is different from the first type of cyclic prefix.

Another aspect of the disclosure provides an apparatus configured for communication. The apparatus including: means for receiving a series of consecutive symbols including a first symbol and a second symbol; means for processing the first symbol based on a first type of cyclic prefix of the first symbol; and means for processing the second symbol based on a second type of cycle prefix of the second symbol, wherein the second type of cyclic prefix is different from the first type of cyclic prefix.

Another aspect of the disclosure provides a non-transitory computer-readable medium storing computer-executable code, including code to: receive a series of consecutive symbols including a first symbol and a second symbol; process the first symbol based on a first type of cyclic prefix of the first symbol; and process the second symbol based on a second type of cycle prefix of the second symbol, wherein the second type of cyclic prefix is different from the first type of cyclic prefix.

In one aspect, the disclosure provides a method of communication for an apparatus. The method includes: generating a first symbol with a first type of cyclic prefix; generating a second symbol with a second type of cycle prefix, wherein the second type of cyclic prefix is different from the first type of cyclic prefix; and transmitting a series of consecutive symbols including the first symbol and the second symbol.

Another aspect of the disclosure provides an apparatus for communication that includes a processing circuit and a transmitter. The processing circuit is configured to: generate a first symbol with a first type of cyclic prefix, and generate a second symbol with a second type of cycle prefix, wherein the second type of cyclic prefix is different from the first type of cyclic prefix. The transmitter is configured to: transmit a series of consecutive symbols including the first symbol and the second symbol.

Another aspect of the disclosure provides an apparatus configured for communication. The apparatus including: means for generating a first symbol with a first type of cyclic prefix; means for generating a second symbol with a second type of cycle prefix, wherein the second type of cyclic prefix is different from the first type of cyclic prefix; and means for transmitting a series of consecutive symbols including the first symbol and the second symbol.

Another aspect of the disclosure provides a non-transitory computer-readable medium storing computer-executable code, including code to: generate a first symbol with a first type of cyclic prefix; generate a second symbol with a second type of cycle prefix, wherein the second type of cyclic prefix is different from the first type of cyclic prefix; and transmit a series of consecutive symbols including the first symbol and the second symbol.

In one aspect, the disclosure provides a method of communication including: designating, at an apparatus, a first time interval associated with a first type of cyclic prefix; transmitting, at the apparatus, a first set of samples following the first time interval; designating, at the apparatus, a second time interval associated with a second type of cyclic prefix that is different from the first type of cyclic prefix; and receiving, at the apparatus, a second set of samples following the second time interval.

Another aspect of the disclosure provides an apparatus configured for communication. The apparatus including: means for designating, configured to designate a first time interval associated with a first type of cyclic prefix; means for transmitting a first set of samples following the first time interval; wherein the means for designating is further configured to designate a second time interval associated with a second type of cyclic prefix that is different from the first type of cyclic prefix; and means for receiving a second set of samples following the second time interval.

Another aspect of the disclosure provides an apparatus for communication that includes: a processing circuit configured to designate a first time interval associated with a first type of cyclic prefix; a transmitter configured to transmit a first set of samples following the first time interval, wherein the processing circuit is further configured to designate a second time interval associated with a second type of cyclic prefix that is different from the first type of cyclic prefix; and a receiver configured to receive a second set of samples following the second time interval.

Another aspect of the disclosure provides a non-transitory computer-readable medium storing computer-executable code, including code to: designate, at an apparatus, a first time interval associated with a first type of cyclic prefix; transmit, at the apparatus, a first set of samples following the first time interval; designate, at the apparatus, a second time interval associated with a second type of cyclic prefix that is different from the first type of cyclic prefix; and receive, at the apparatus, a second set of samples following the second time interval.

In one aspect, the disclosure provides a method of communication including: designating, by an apparatus, a first time interval associated with a first type of cyclic prefix; communicating, by the apparatus, a first set of samples following the first time interval; designating, by the apparatus, a second time interval associated with a second type of cyclic prefix following the first set of samples; and communicating, by the apparatus, a second set of samples following the second time interval.

Another aspect of the disclosure provides an apparatus configured for communication. The apparatus including: means for designating, configured to designate a first time interval associated with a first type of cyclic prefix; and means for communicating, configured to communicate a first set of samples following the first time interval; wherein the means for designating is further configured to designate a second time interval associated with a second type of cyclic prefix following the first set of samples, and the means for communicating is further configured to communicate a second set of samples following the second time interval.

Another aspect of the disclosure provides an apparatus for communication that includes: a processing circuit configured to designate a first time interval associated with a first type of cyclic prefix; and a communication interface configured to communicate a first set of samples following the first time interval, wherein the processing circuit is further configured to designate a second time interval associated with a second type of cyclic prefix following the first set of samples, and the communication interface is further configured to communicate a second set of samples following the second time interval.

Another aspect of the disclosure provides a non-transitory computer-readable medium storing computer-executable code, including code to: designate, by an apparatus, a first time interval associated with a first type of cyclic prefix; communicate, by the apparatus, a first set of samples following the first time interval; designate, by the apparatus, a second time interval associated with a second type of cyclic prefix following the first set of samples; and communicate, by the apparatus, a second set of samples following the second time interval.

In one aspect, the disclosure provides a method for communication including: changing a beamforming configuration during a cyclic prefix period that precedes a symbol period associated with the cyclic prefix period; and communicating samples during the symbol period, wherein the communicating uses the changed beamforming configuration.

Another aspect of the disclosure provides an apparatus configured for communication. The apparatus including: means for changing a beamforming configuration during a cyclic prefix period that precedes a symbol period associated with the cyclic prefix period; and means for communicating samples during the symbol period, wherein the communicating uses the changed beamforming configuration.

Another aspect of the disclosure provides an apparatus for communication that includes a memory device and a processing circuit coupled to the memory device. The processing circuit is configured to: change a beamforming configuration during a cyclic prefix period that precedes a symbol period associated with the cyclic prefix period; and communicate samples during the symbol period, wherein the communicating uses the changed beamforming configuration.

Another aspect of the disclosure provides a non-transitory computer-readable medium storing computer-executable code, including code to: change a beamforming configuration during a cyclic prefix period that precedes a symbol period associated with the cyclic prefix period; and communicate samples during the symbol period, wherein the communicating uses the changed beamforming configuration.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The disclosure relates in some aspects to a transmitting device changing its beamforming configuration during a cyclic prefix (CP) time period that precedes a symbol period. For example, a base station can change the beamforming configuration for its transmitter during an orthogonal frequency-division multiplexing (OFDM) cyclic prefix window that precedes a fast Fourier transform (FFT) window. A receiving device then reconstructs the cyclic prefix based on the chips (samples) received during the FFT window.

Some modulation schemes employ a so-called zero-CP that does not include symbols from the following symbol period. If the beamforming configuration is changed during a zero-CP time period, there is no loss of data signaling due to the transmitter reconfiguring its beamforming.

Figure 1:
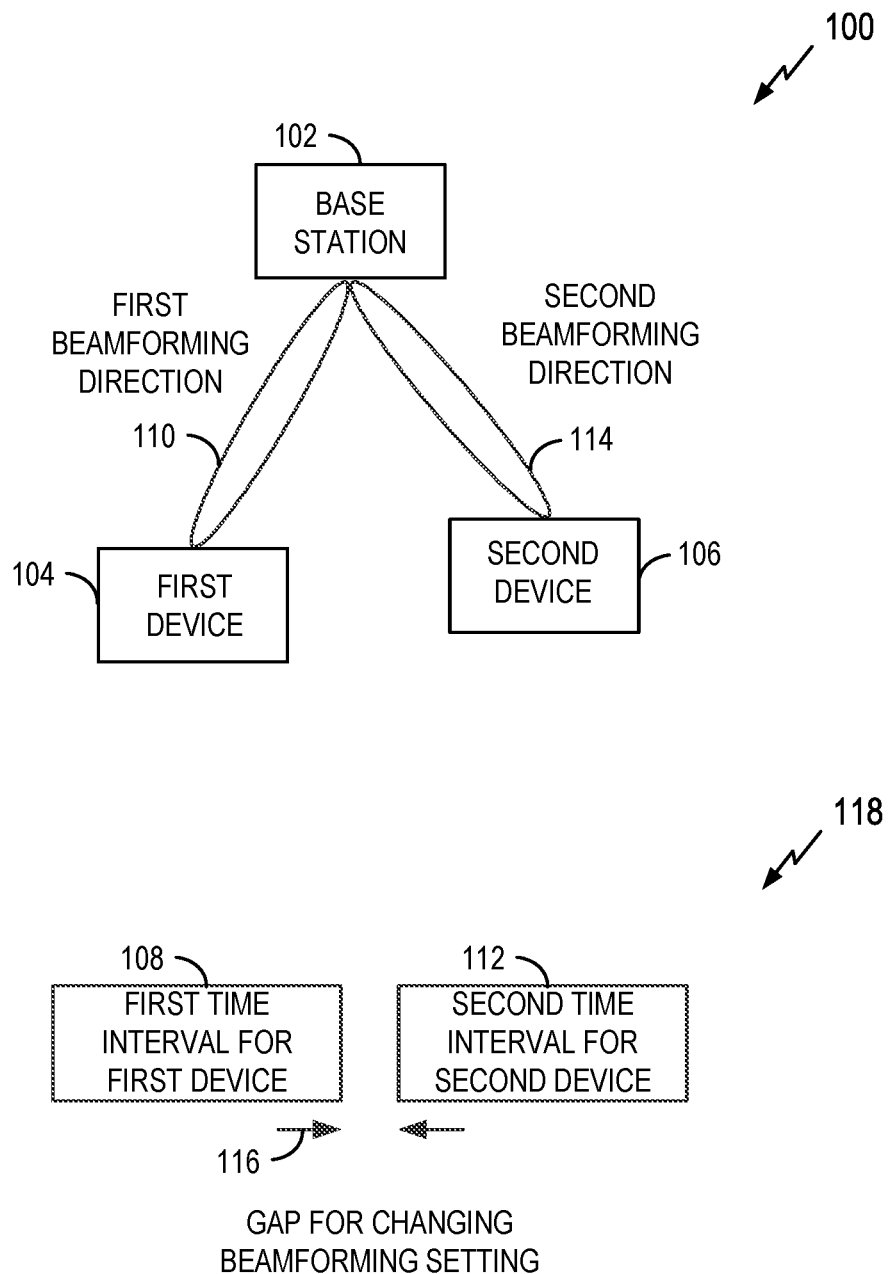
FIG. 1 illustrates several aspects of a communication system employing beamforming.
Figure 2:
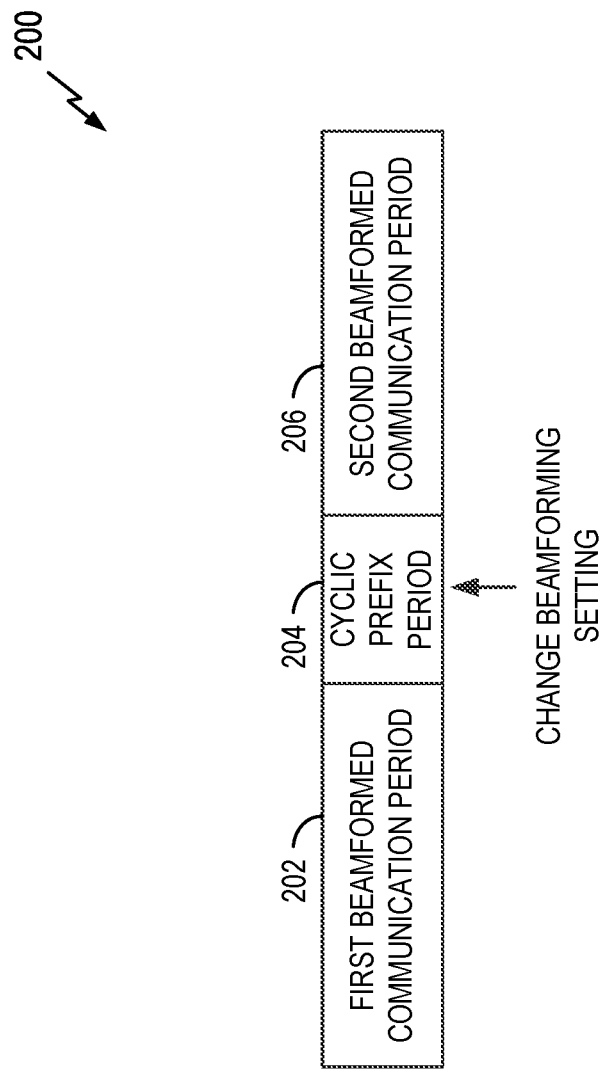
FIG. 2 illustrates an example of changing a beamforming setting during a cyclic prefix in accordance with some aspects of the disclosure.

FIG. 2 illustrates an example of a signaling diagram 200 including a first beamformed communication period 202, a cyclic prefix period 204, and a second beamformed communication period 206. Here, the beamforming setting is changed during the cyclic prefix period 204. Thus, there is no loss of data signaling due to the transmitter changing its beamforming setting.

Figure 3:
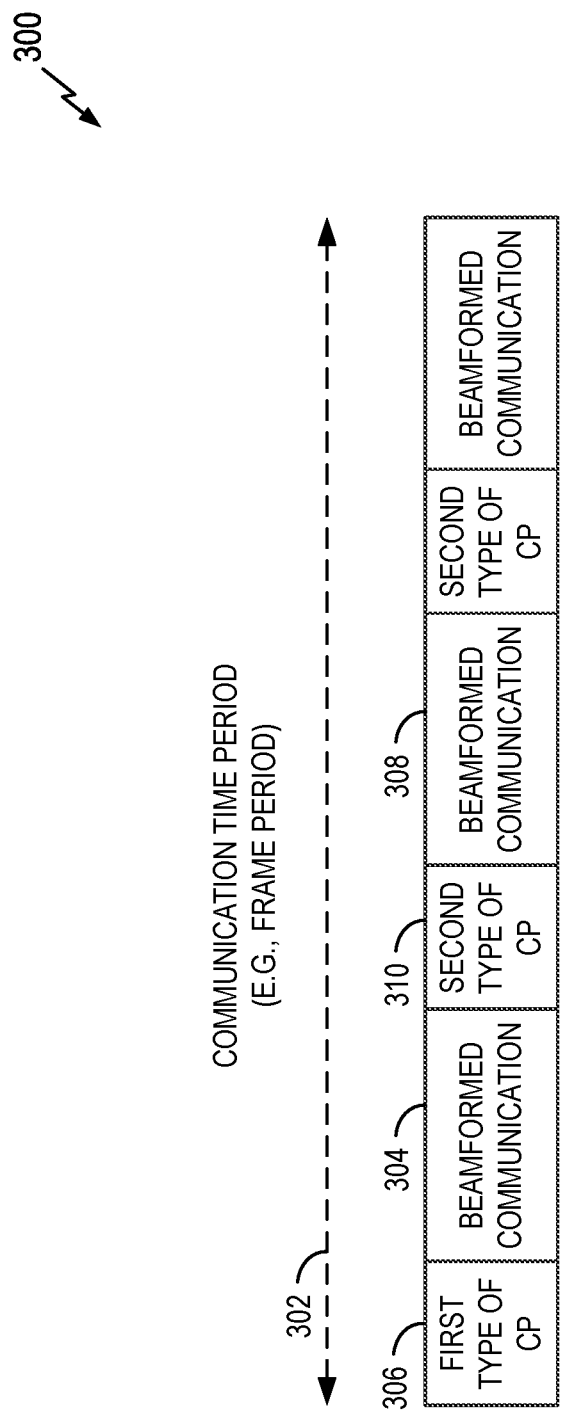
FIG. 3 illustrates an example of switching between different cyclic prefix types in accordance with some aspects of the disclosure.

The disclosure also relates in some aspects to devices using different types of cyclic prefixes for communication. As shown in the signaling diagram 300 of FIG. 3, during a communication time period 302 (e.g., a frame period), beamformed communication 304 between a first device (not shown) and a second device (not shown) is initially based on a first type of cyclic prefix 306. Subsequent beamformed communication 308 between the first device and the second device is then based on a second type of cyclic prefix 310. The different types of cyclic prefixes can include: 1) a regular-CP that includes symbols from the following symbol period; and 2) a zero-CP that does not include symbols from the following symbol period.

As a first example, a first device can designate a first time interval associated with a first type of cyclic prefix and then transmit a first set of samples to a second device after the first time interval. The first device can then designate a second time interval associated with a second type of cyclic prefix and receive a second set of samples from the second device after the second time interval.

As a second example, a first device can designate a first time interval associated with a first type of cyclic prefix and then transmit a first set of samples to a second device after the first time interval. The first device can then designate a second time interval associated with a second type of cyclic prefix and transmit a second set of samples to the second device after the second time interval.

Several additional aspects of the disclosure will be described with reference to FIGS. 4-12. For purposes of illustration, these figures may illustrate various components in the context of a mmW architecture and/or orthogonal frequency-division multiplexing (OFDM) signaling. It should be appreciated, however, that the teachings herein may be employed in other types of radio technologies and architectures (e.g., single carrier communication, etc.). Also, various operations may be described as being performed by specific types of components (e.g., base stations, client devices, peer-to-peer devices, user equipment (UE), and so on). It should be understood that these operations can be performed by other types of devices. To reduce the complexity of these figures, only few example components are shown. However, the teachings herein can be implemented using a different number of components or other types of components.

Figure 4:
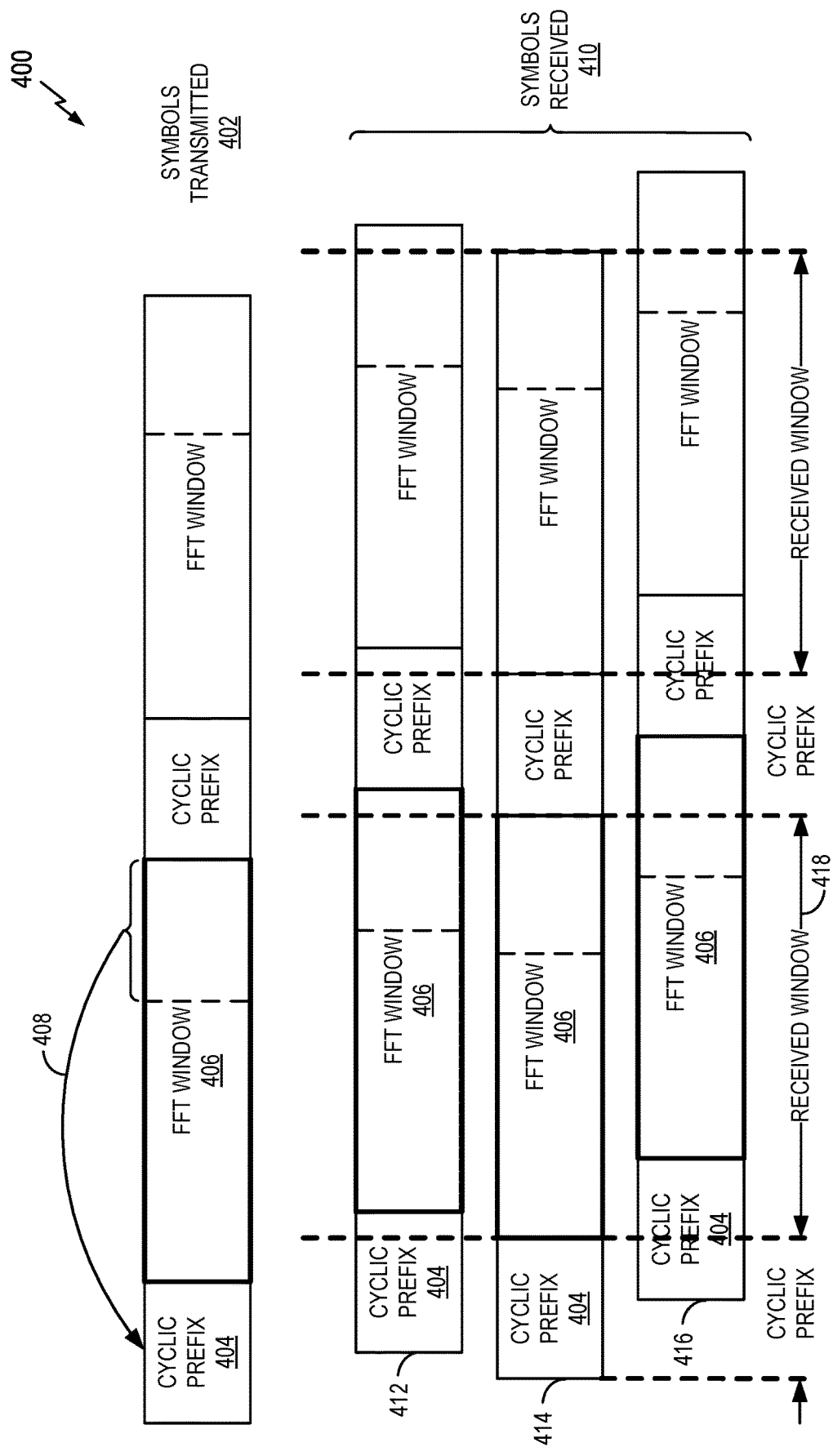
FIG. 4 illustrates an example of a waveform employing a cyclic prefix.

In a multiple access system that uses OFDM as the basic modulation scheme, a cyclic prefix (CP) may be used in some implementations as illustrated in the signaling diagram 400 of FIG. 4. Here, each of the symbols transmitted 402 by a transmitter (e.g., in a downlink from a base station, not shown) is associated with a period for a CP 404 and an FFT window 406. A CP involves prefixing 408 a symbol (referred to as the FFT window) with a repetition of the end of the symbol. A receiver (not shown) receives symbols 410 including three multipath components 412, 414, and 416. In a multi-path channel environment, multiple copies of a transmitted OFDM signal arrive at the receiver, therefore resulting in inter-symbol-interference (ISI). The time difference between these multi-path copies depends on the delay spread of the channel. As long as the cyclic prefix is at least as long as the delay spread, the receiver can discard the received samples in the cyclic prefix interval and simply use the samples in the FFT window for demodulation and decoding since ISI is not a significant issue in this scenario. Thus, in this scenario, the transmitter transmits both the CP and the FFT window, while the receiver might only process the received window 418 (FFT window).

Figure 5:
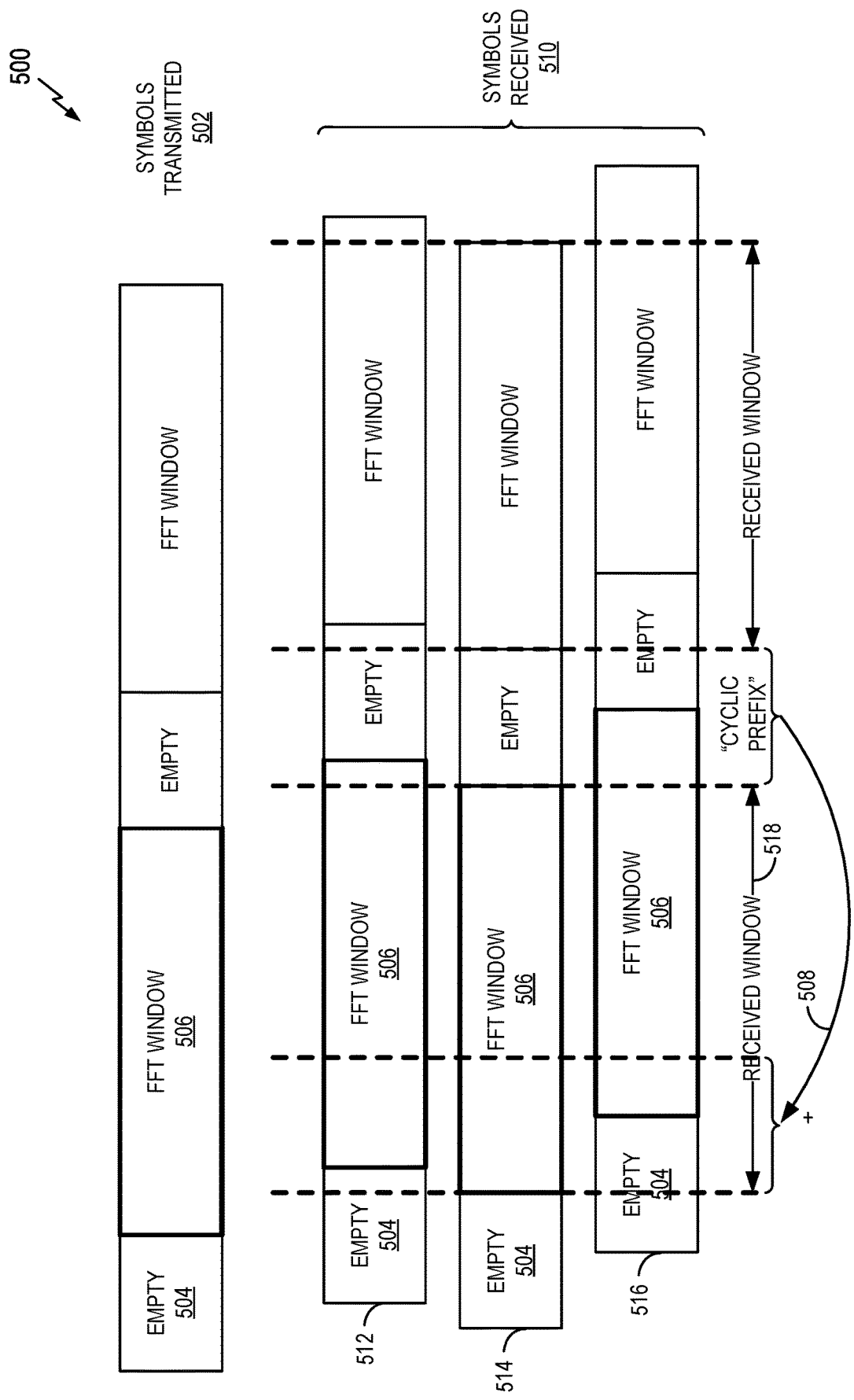
FIG. 5 illustrates an example of a waveform employing a zero-cyclic prefix.

In another OFDM implementation, a transmitter (not shown) transmits a symbol in the FFT window, and leaves empty a time interval equal to the length of CP before transmitting the next symbol, as shown in the signaling diagram 500 of FIG. 5. Each of the symbols transmitted 502 (e.g., in a downlink from a base station) is associated with an empty CP period 504 and an FFT window 506. A receiver (not shown) receives symbols 510 including three multipath components 512, 514, and 516. The receiver processes the samples in the received window 518 (FFT window) as well as in the time interval labeled as "cyclic prefix" in FIG. 5. Specifically, the receiver adds 508 the samples in the time interval labeled as "cyclic prefix" in the figure to the beginning of the received window 518 so that the resulting FFT window contains a complete symbol. Without a complete symbol, OFDM may suffer from inter-carrier-interference (ICI). In other words, if the receiver ignores the samples in the "cyclic prefix" portion, although there is no ISI (due the use of the empty guard period between two symbols), there may be ICI.

Figure 6:
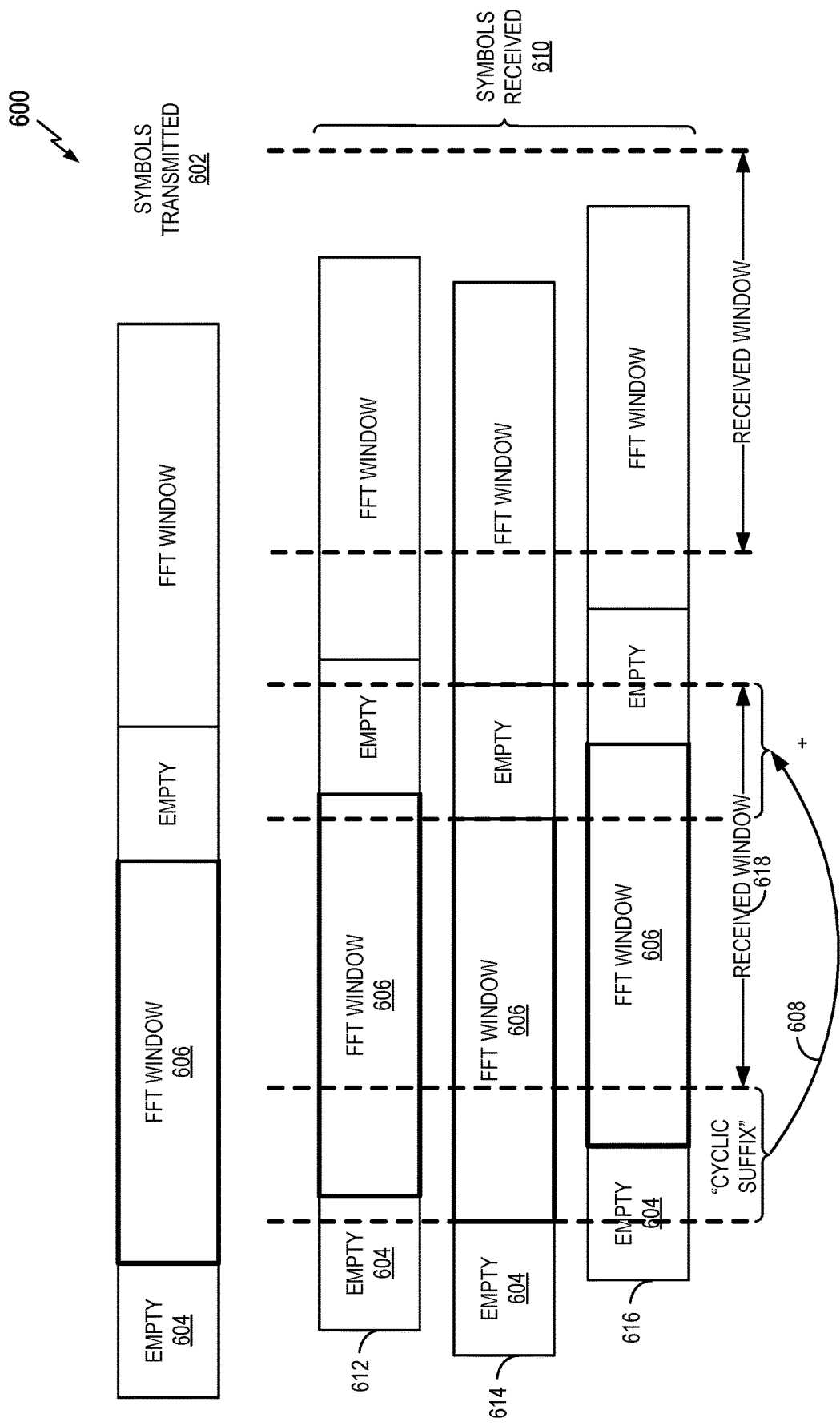
FIG. 6 illustrates another example of a waveform employing a zero-cyclic prefix.
Figure 7:
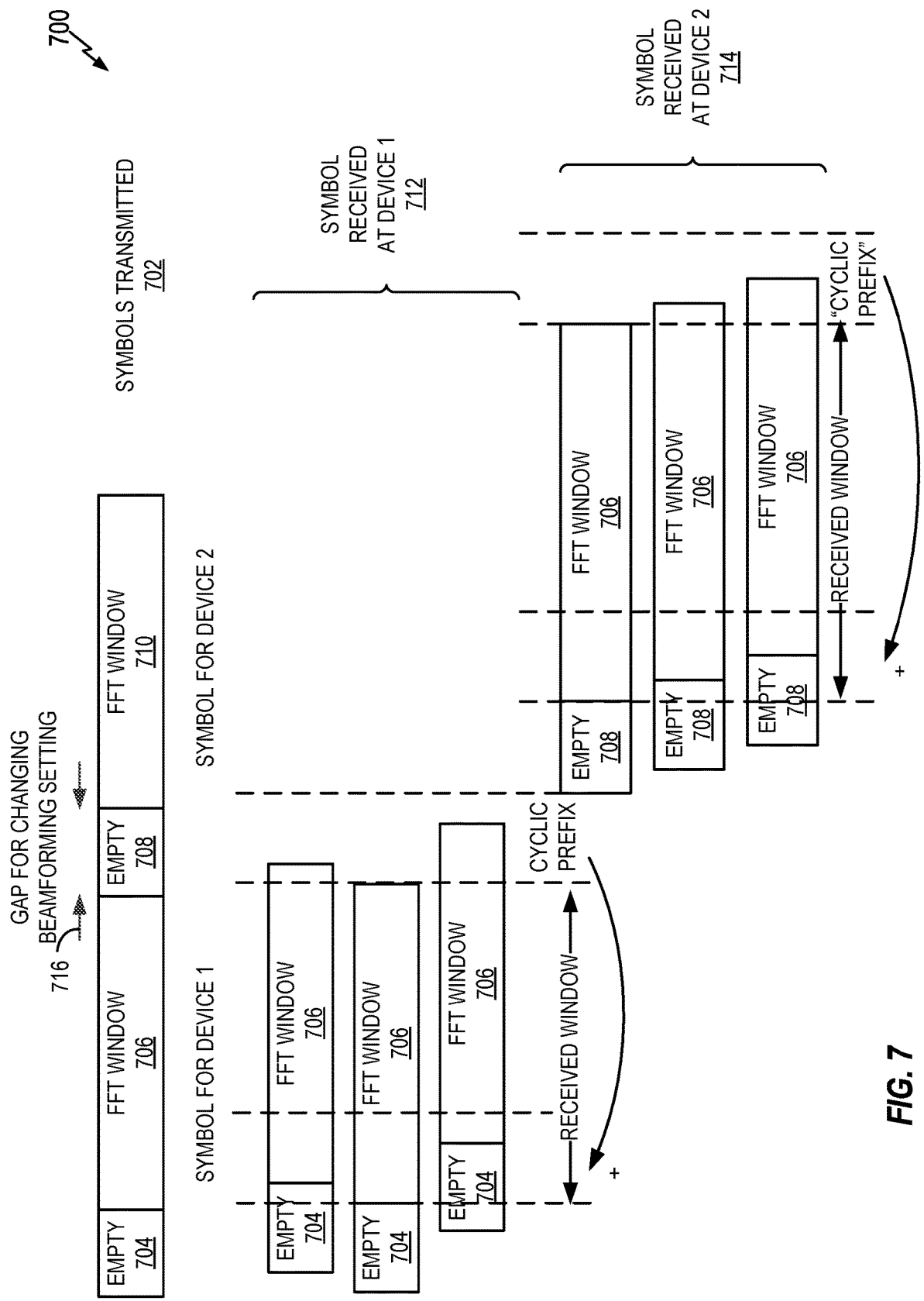
FIG. 7 illustrates an example of changing a transmit beamforming setting during a cyclic prefix in accordance with some aspects of the disclosure.

FIG. 6 illustrates an alternative implementation to FIG. 5. In the signaling diagram 600 of FIG. 6, each of the symbols transmitted 602 by a transmitter (e.g., in a downlink from a base station, not shown) is associated with an empty CP period 604 and an FFT window 606. A receiver (not shown) receives symbols 610 including three multipath components 612, 614, and 616. The receiver adds 608 the samples in the time interval labeled as "cyclic suffix" in FIG. 6 to the end of the received window 618 (FFT window).

The scheme of FIG. 4 is referred to as regular-CP OFDM and the schemes of FIGS. 5 and 6 are referred to as zero-CP OFDM.

The disclosure relates in some aspects to using zero-CP OFDM for transmission (e.g., in the downlink). In this way, the beamforming configuration of a transmitter can be changed during the empty interval (zero-CP) as shown in the signaling diagram 700 of FIG. 7. Here, the symbols transmitted 702 by a transmitter (e.g., in a downlink from a base station, not shown) are associated with an empty CP period 704, an FFT window 706, an empty CP period 708, and an FFT window 710. A first receiver (device 1, not shown) receives a symbol 712 including three multipath components. A second receiver (device 2, not shown) receives a symbol 714 including three multipath components. The transmitter uses a CP-based interval (gap) 716 to change the transmitter's beamforming setting between the FFT windows 706 and 710.

Figure 8:
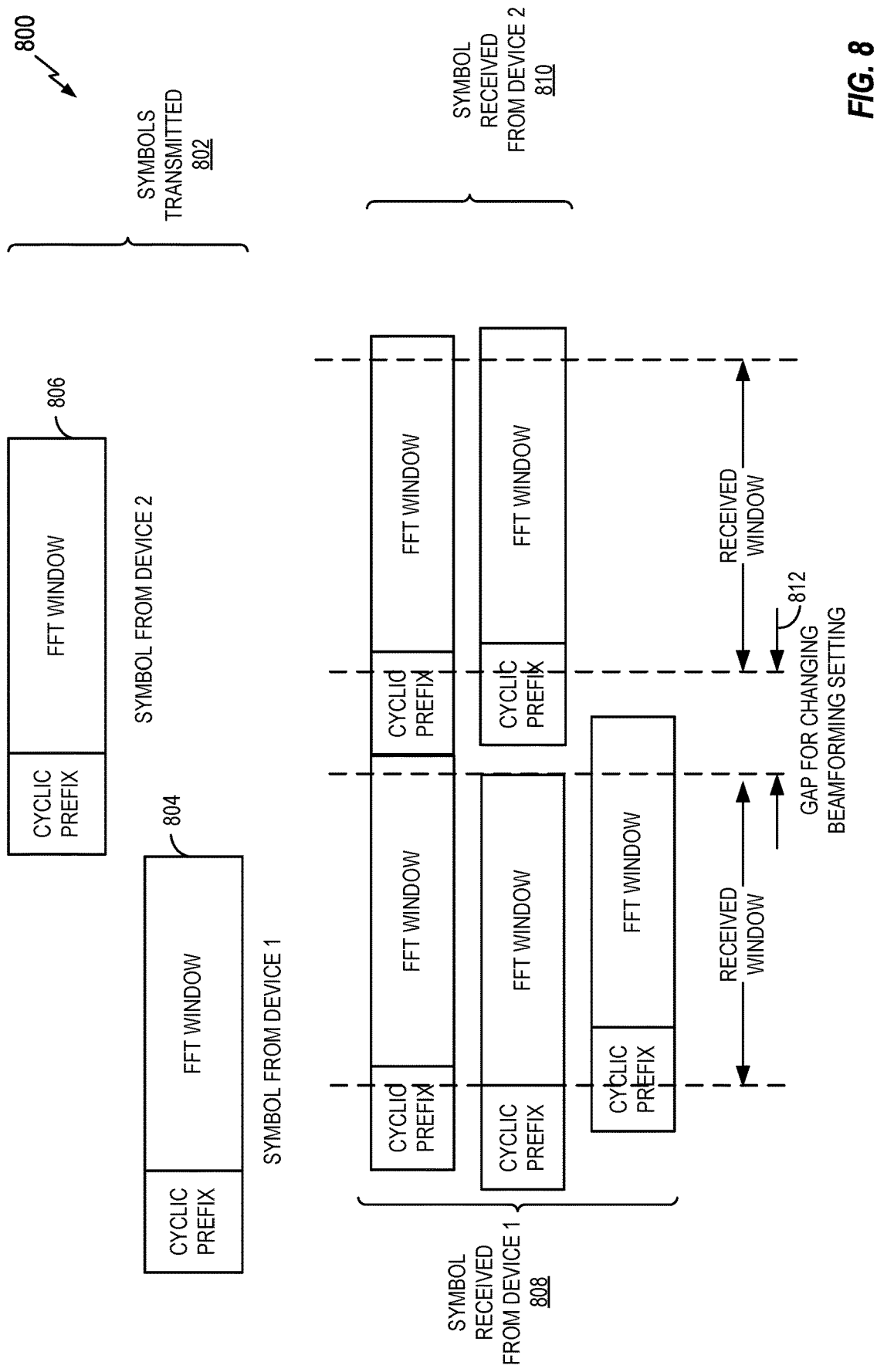
FIG. 8 illustrates an example of changing a receive beamforming setting in accordance with some aspects of the disclosure.

The disclosure also relates in some aspects to using zero-CP OFDM for transmission (e.g., in the downlink) and regular-CP OFDM for reception (e.g., in the uplink), as shown in the signaling diagram 800 of FIG. 8. Here, symbols transmitted 802 (e.g., in an uplink) include a symbol 804 from a first device (device 1, not shown) and a symbol 806 from a second device (device 2, not shown). A receiver (e.g., a base station, not shown) receives (with multi-path) a symbol 808 from the first device and a symbol 810 from the second device. In addition, the receiver may use a CP-based interval (gap) 812 to change the receiver's beamforming setting.

Figure 9:
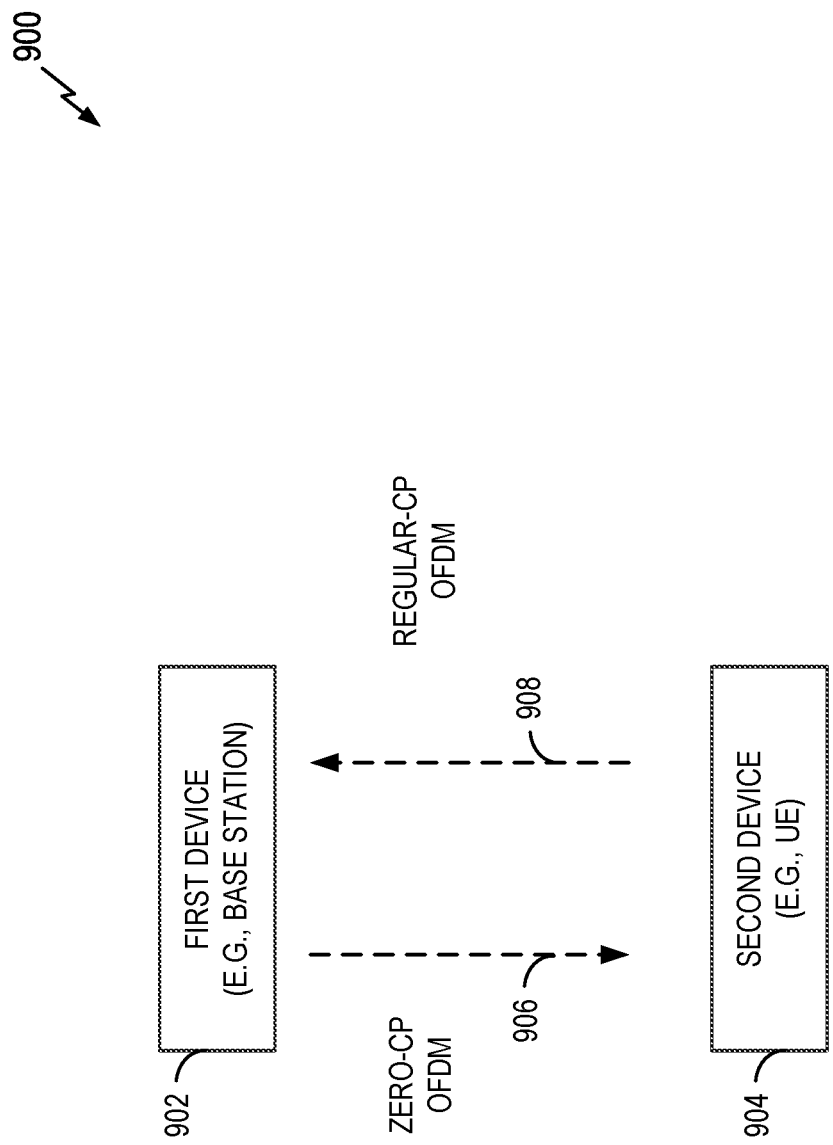
FIG. 9 illustrates an example of using different cyclic prefix types for transmission and reception in accordance with some aspects of the disclosure.

FIG. 9 illustrates an example of a system 900 wherein a first device 902 (e.g., a base station) communicates via beamforming with a second device 904 (e.g., a user equipment (UE)). In accordance with the teachings herein, the first device 902 and the second device 904 use different types of cyclic prefix (CP) waveforms for transmission and reception. In this example, the first device 902 transmits zero-CP OFDM waveforms 906 to the second device 904 and receives regular-CP OFDM waveforms 908 from the second device 904. Conversely, the second device 904 receives zero-CP OFDM waveforms 906 from the first device 902 and transmits regular-CP OFDM waveforms 908 to the first device 902.

In some aspects, a device may dynamically determine whether to use different CP types for transmission and reception. For example, upon determining that changes in the beamforming configuration will be needed (e.g., due to a need to switch communication from one device to another, due to changing channel conditions, due to movement of a device, etc.), a device may elect to use different CP types for transmission and reception. Also, in some implementations, a first device may send a message that tells another device the CP types that will be used by the first device, and when those CP types will be used. Alternatively, or in addition, devices may be configured to expect that particular CP types will be used at certain times and/or with particular symbols. For example, by default, particular CP types may be used during certain periods of a frame (e.g., a frame structure specifies when certain CP types are used). As one example, all symbols that are continuously allocated for a particular receiver may be transmitted using a particular CP type (e.g., regular-CP). As another example, zero-CP may be used at known boundaries (e.g., frame boundaries, beacon frames, etc.) and regular-CP used at other times.

Figure 10:
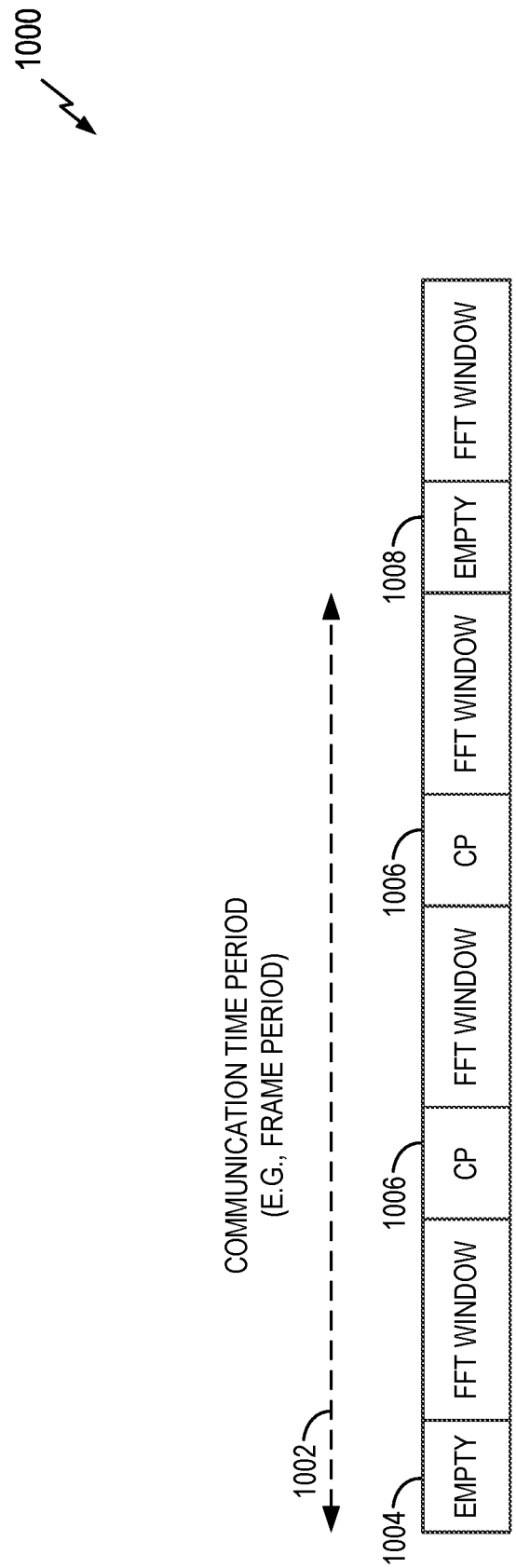
FIG. 10 illustrates an example of using different cyclic prefix types for communication in accordance with some aspects of the disclosure.

FIG. 10 illustrates an example of a signaling diagram 1000 where different types of cyclic prefix (CP) waveforms are used. For example, communication during a given communication time period 1002 may be reserved for communication from one device to another device (devices not shown). Thus, a transmitting device may be able to use the same beamforming configuration during the entire communication time period 1002 (e.g., a frame period, a defined number of symbols, etc.). Accordingly, the transmitting device may use a zero-CP 1004 for a first FFT window and regular-CP 1006 for subsequent FFT windows during the communication time period 1002.

For subsequent communication time periods, the transmitting device may determine whether a change in the beamforming configuration is indicated (e.g., due to a need to switch communication from one receiving device to another, etc.). If such a change is indicated, the transmitting device may again use a zero-CP 1008 for the first FFT window in that communication time window. Again, devices may exchange information indicative of what CP types will be used and when these CP types will be used and/or the devices may be configured with this information (e.g., upon deployment).

Figure 11:
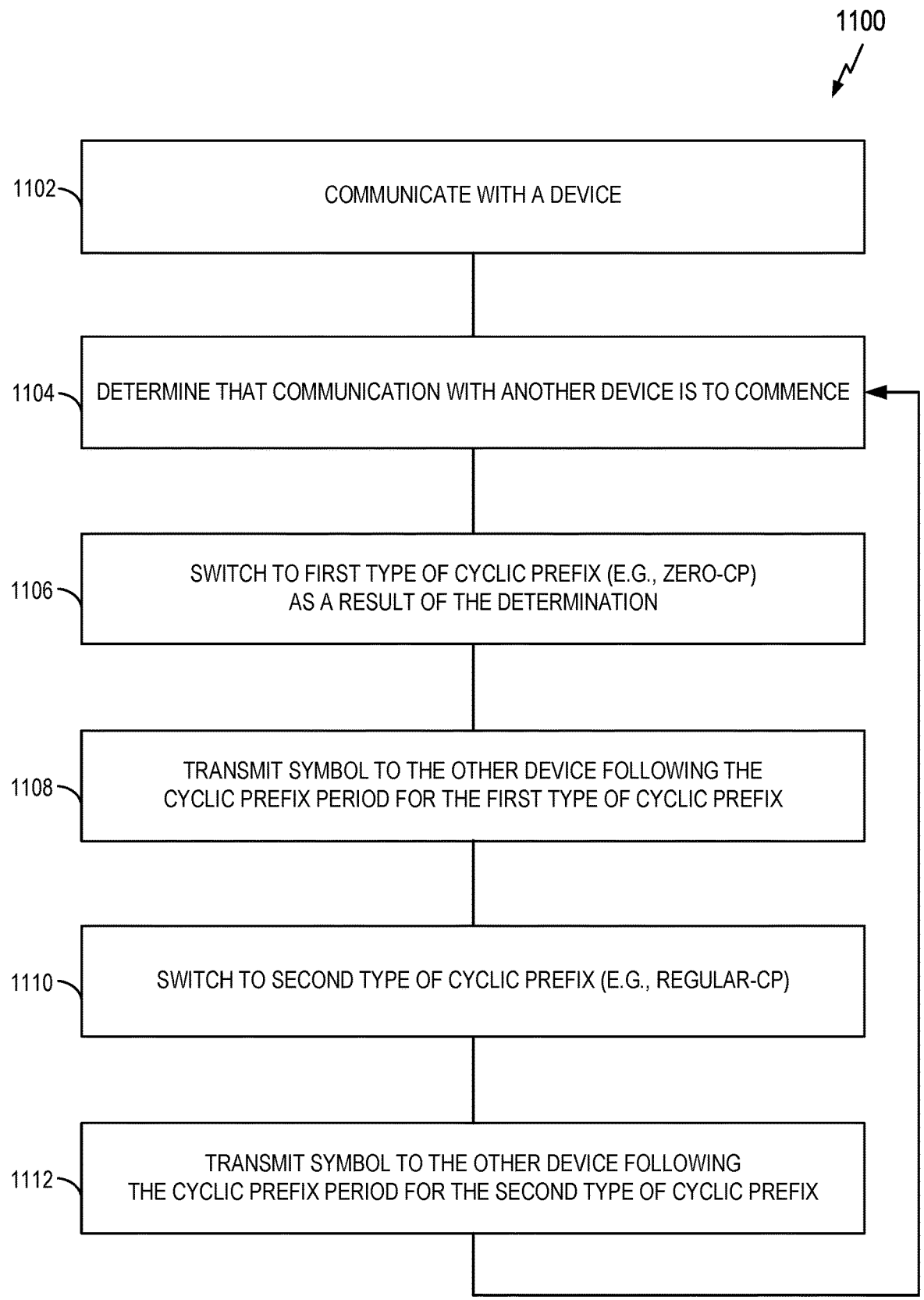
FIG. 11 illustrates an example of a process for switching cyclic prefix types in accordance with some aspects of the disclosure.

FIG. 11 illustrates a process 1100 for beamforming-based communication in accordance with some aspects of the disclosure. The process 1100 may take place within a processing circuit (e.g., the processing circuit 1310 of FIG. 13 discussed below), which may be located in a base station, a mobile device, or some other suitable apparatus. Of course, in various aspects within the scope of the disclosure, the process 1100 may be implemented by any suitable apparatus capable of supporting beamforming-related operations.

At block 1102, an apparatus (e.g., a base station, a mobile device, etc.) communicates with a device. For example, a base station may initially communicate with a first device (e.g., a first UE). This communication may involve transmission and/or reception. In addition, this communication may involve use of an initial type of CP (e.g., regular-CP).

At block 1104, the apparatus determines that communication with another device is to commence. For example, the apparatus may communicate with a first device during a first time period and then determine that it needs to communicate with a second device (e.g., a second UE) during a second time period.

At block 1106, the apparatus switches to a first type of cyclic prefix as a result of the determination of block 1104. In the event, the first type of cyclic prefix is zero-CP, the apparatus does not transmit samples during the corresponding cyclic prefix period.

At block 1108, the apparatus transmits a symbol to the other device. This transmission follows the cyclic prefix period for the first type of cyclic prefix.

At block 1110, the apparatus switches to a second type of cyclic prefix. In the event, the second type of cyclic prefix is regular-CP, the apparatus transmits the appropriate CP samples during the corresponding cyclic prefix period.

At block 1112, the apparatus transmits a symbol to the other device. This transmission follows the cyclic prefix period for the second type of cyclic prefix.

The operations of blocks 1104-1112 may then repeat for subsequent communications.

Figure 12:
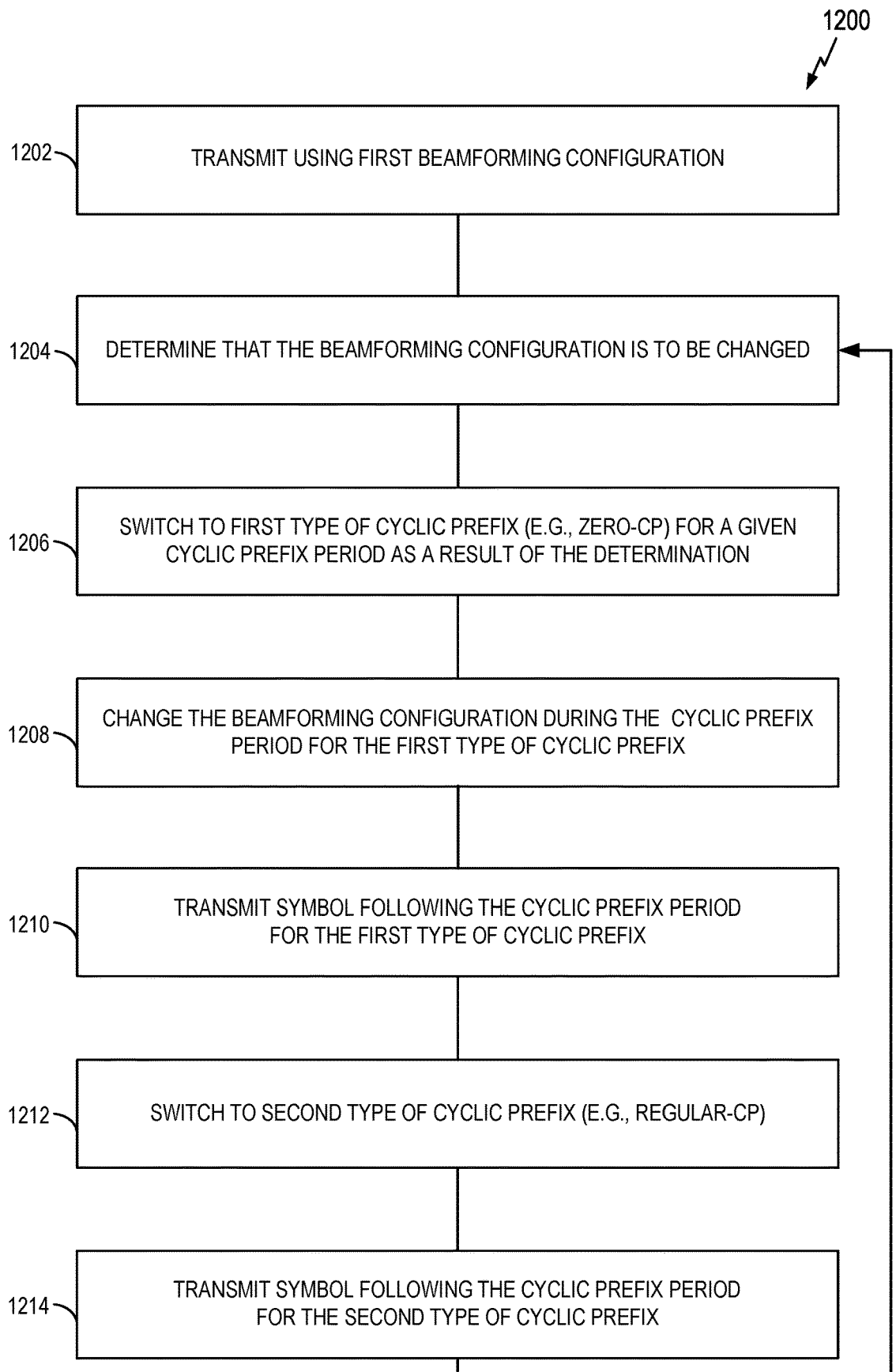
FIG. 12 illustrates another example of a process for switching cyclic prefix types in accordance with some aspects of the disclosure.

FIG. 12 illustrates a process 1200 for beamforming-based communication in accordance with some aspects of the disclosure. The process 1200 may take place within a processing circuit (e.g., the processing circuit 1310 of FIG. 13 discussed below), which may be located in a base station, a mobile device, or some other suitable apparatus. Of course, in various aspects within the scope of the disclosure, the process 1200 may be implemented by any suitable apparatus capable of supporting beamforming-related operations.

At block 1202, an apparatus (e.g., a base station, a mobile device, etc.) transmits using a first beamforming configuration. For example, a base station may initially transmit to a first device (e.g., a first UE). This transmission may involve use of an initial type of CP (e.g., regular-CP).

At block 1204, the apparatus determines that the beamforming configuration is to be changed. For example, the apparatus may determine that a new beamforming configuration is need due to at least one of: a change in a channel conditions that necessitates use of a different beam shape, a need to communicate with another device, movement of the device with which the apparatus is currently in communication, or an obstruction in the beam path.

At block 1206, the apparatus switches to a first type of cyclic prefix (e.g., zero-CP) for a given cyclic prefix period as a result of the determination of block 1204.

At block 1208, the apparatus changes the beamforming configuration (e.g., setting) during the cyclic prefix period for the first type of cyclic prefix.

At block 1210, the apparatus transmits a symbol following the cyclic prefix period for the first type of cyclic prefix.

At block 1212, the apparatus switches to a second type of cyclic prefix (e.g., regular-CP).

At block 1214, the apparatus transmits a symbol following the cyclic prefix period for the second type of cyclic prefix.

The operations of blocks 1204-1214 may then repeat for subsequent communications.

Example Apparatus

Figure 13:
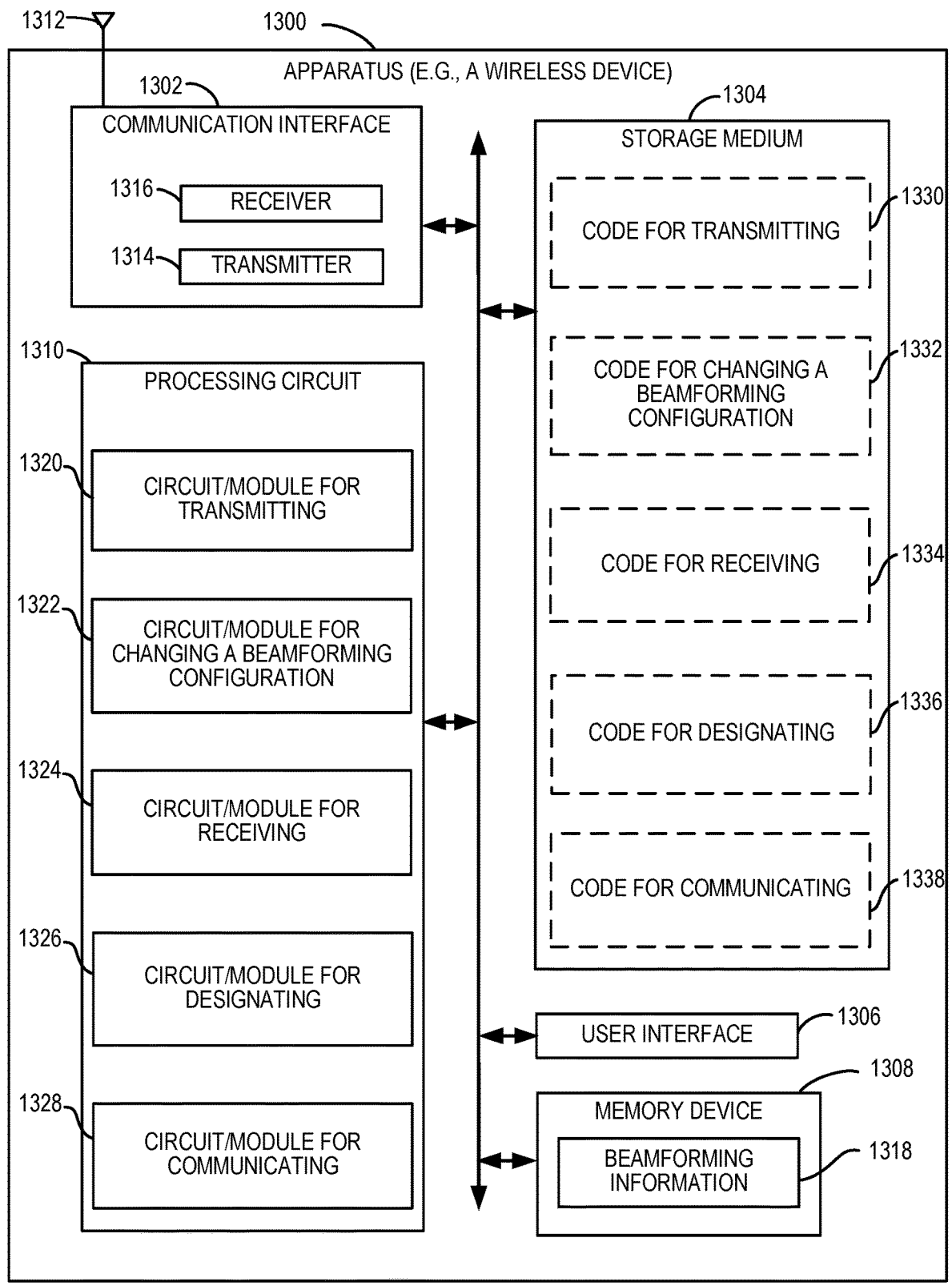
FIG. 13 illustrates a block diagram of an example hardware implementation for an apparatus (e.g., an electronic device) that can execute one or more of the disclosed processes for communication in accordance with some aspects of the disclosure.

FIG. 13 illustrates a block diagram of an example hardware implementation of an apparatus 1300 (e.g., a wireless device) configured to communicate according to one or more aspects of the disclosure. For example, the apparatus 1300 could embody an access terminal, an access point, or some other type of device. In various implementations, the apparatus 1300 could be a mobile phone, a smart phone, a tablet, a portable computer, a server, a personal computer, a sensor, and or any other electronic device having circuitry.

The apparatus 1300 includes a communication interface (e.g., at least one transceiver) 1302, a storage medium 1304, a user interface 1306, a memory device (e.g., a memory circuit) 1308, and a processing circuit (e.g., at least one processor) 1310. In various implementations, the user interface 1306 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 13. The signaling bus may include any number of interconnecting buses and bridges depending on the specific application of the processing circuit 1310 and the overall design constraints. The signaling bus links together various circuits such that each of the communication interface 1302, the storage medium 1304, the user interface 1306, and the memory device 1308 are coupled to and/or in electrical communication with the processing circuit 1310. The signaling bus may also link various other circuits (not shown) such as timing sources, peripherals, voltage regulators, and power management circuits, which are well known in the art, and therefore, will not be described any further.

The communication interface 1302 provides a means for communicating with other apparatuses over a transmission medium. In some implementations, the communication interface 1302 includes circuitry and/or programming adapted to facilitate the communication of information bi-directionally with respect to one or more communication devices in a network. In some implementations, the communication interface 1302 is adapted to facilitate wireless communication of the apparatus 1300. In these implementations, the communication interface 1302 may be coupled to one or more antennas 1312 as shown in FIG. 13 for wireless communication within a wireless communication system. The communication interface 1302 can be configured with one or more standalone receivers and/or transmitters, as well as one or more transceivers. In the illustrated example, the communication interface 1302 includes a transmitter 1314 and a receiver 1316. The communication interface 1302 serves as one example of a means for receiving and/or means transmitting.

The memory device 1308 may represent one or more memory devices. As indicated, the memory device 1308 may maintain beamforming information 1318 along with other information used by the apparatus 1300. In some implementations, the memory device 1308 and the storage medium 1304 are implemented as a common memory component. The memory device 1308 may also be used for storing data that is manipulated by the processing circuit 1310 or some other component of the apparatus 1300.

The storage medium 1304 may represent one or more computer-readable, machine-readable, and/or processor-readable devices for storing programming, such as processor executable code or instructions (e.g., software, firmware), electronic data, databases, or other digital information. The storage medium 1304 may also be used for storing data that is manipulated by the processing circuit 1310 when executing programming. The storage medium 1304 may be any available media that can be accessed by a general purpose or special purpose processor, including portable or fixed storage devices, optical storage devices, and various other mediums capable of storing, containing or carrying programming.

By way of example and not limitation, the storage medium 1304 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1304 may be embodied in an article of manufacture (e.g., a computer program product). By way of example, a computer program product may include a computer-readable medium in packaging materials. In view of the above, in some implementations, the storage medium 1304 may be a non-transitory (e.g., tangible) storage medium.

The storage medium 1304 may be coupled to the processing circuit 1310 such that the processing circuit 1310 can read information from, and write information to, the storage medium 1304. That is, the storage medium 1304 can be coupled to the processing circuit 1310 so that the storage medium 1304 is at least accessible by the processing circuit 1310, including examples where at least one storage medium is integral to the processing circuit 1310 and/or examples where at least one storage medium is separate from the processing circuit 1310 (e.g., resident in the apparatus 1300, external to the apparatus 1300, distributed across multiple entities, etc.).

Programming stored by the storage medium 1304, when executed by the processing circuit 1310, causes the processing circuit 1310 to perform one or more of the various functions and/or process operations described herein. For example, the storage medium 1304 may include operations configured for regulating operations at one or more hardware blocks of the processing circuit 1310, as well as to utilize the communication interface 1302 for wireless communication utilizing their respective communication protocols.

The processing circuit 1310 is generally adapted for processing, including the execution of such programming stored on the storage medium 1304. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1310 is arranged to obtain, process and/or send data, control data access and storage, issue commands, and control other desired operations. The processing circuit 1310 may include circuitry configured to implement desired programming provided by appropriate media in at least one example. For example, the processing circuit 1310 may be implemented as one or more processors, one or more controllers, and/or other structure configured to execute executable programming. Examples of the processing circuit 1310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1310 are for illustration and other suitable configurations within the scope of the disclosure are also contemplated.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, processes, etc., described with respect to FIGS. 1-12 and 14-20. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application specific integrated circuit (ASIC) that serves as a means for (e.g., structure for) carrying out any one of the operations described in conjunction with FIGS. 1-12 and 14-20. The processing circuit 1310 serves as one example of a means for transmitting and/or a means for receiving.

According to at least one example of the apparatus 1300, the processing circuit 1310 may include one or more of a circuit/module for transmitting 1320, a circuit/module for changing a beamforming configuration 1322, a circuit/module for receiving 1324, a circuit/module for designating 1326, or a circuit/module for communicating 1328.

The circuit/module for transmitting 1320 may include circuitry and/or programming (e.g., code for transmitting 1330 stored on the storage medium 1304) adapted to perform several functions relating to, for example, transmitting samples during a symbol period. Initially, the circuit/module for transmitting 1320 obtains data to be transmitted. For example, the circuit/module for transmitting 1320 may obtain this data directly from a component of the apparatus (e.g., the memory device 1308 or some other component). In some implementations, the circuit/module for transmitting 1320 processes (e.g., encodes) the data to be transmitted. The circuit/module for transmitting 1320 then causes the data to be transmitted. For example, the circuit/module for transmitting 1320 can pass the data to the transmitter 1314 for subsequent radio frequency (RF) transmission. In some implementations, the transmitter 1314 includes the circuit/module for transmitting 1320 and/or the code for transmitting 1326.

The circuit/module for changing a beamforming configuration 1322 may include circuitry and/or programming (e.g., code for changing a beamforming configuration 1332 stored on the storage medium 1304) adapted to perform several functions relating to, for example, changing from a first beamforming configuration to a second beamforming configuration during a cyclic prefix period or at some other time. Initially, the circuit/module for changing a beamforming configuration 1322 receives an indication that a beamforming configuration is to be changed. In addition, the circuit/module for changing a beamforming configuration 1322 obtains parameters (e.g., from the memory device 1308, the receiver 1316, or some other component) for the new beamforming configuration. These parameters may include, for example, an amplitude value and a phase value for each antenna subject to configuration. The circuit/module for changing a beamforming configuration 1322 then generates, based on the obtained parameters, at least one control signal that controls at least one component (e.g., an amplifier and/or a phase shifter) of the transmitter 1314 and/or the receiver 1316 to provide the desired beamforming when the transmitter 1314 transmits radio frequency (RF) signals and/or the receiver 1316 receives RF signals.

The circuit/module for receiving 1324 may include circuitry and/or programming (e.g., code for receiving 1334 stored on the storage medium 1304) adapted to perform several functions relating to, for example, receiving samples during a symbol period. Initially, the circuit/module for receiving 1324 obtains received information. For example, the circuit/module for receiving 1324 may obtain this information from a component of the apparatus (e.g., the receiver 1316, the memory device 1308, or some other component) or directly from a device (e.g., an access terminal) that transmitted the parameter(s). In some implementations, the circuit/module for receiving 1324 identifies a location in the memory device 1308 or some other component and invokes a read of that location to receive the information. In some implementations, the circuit/module for receiving 1324 processes (e.g., decodes) the received information. The circuit/module for receiving 1324 then outputs the received information (e.g., stores the information in the memory device 1308 or sends the information to another component of the apparatus 1300). In some implementations, the receiver 1316 includes the circuit/module for receiving 1324 and/or the code for receiving 1334.

The circuit/module for designating 1326 may include circuitry and/or programming (e.g., code for designating 1336 stored on the storage medium 1304) adapted to perform several functions relating to, for example, designating time intervals associated with different cyclic prefix periods. Initially, the circuit/module for designating 1326 receives an indication that a cyclic prefix period is to be designated. In addition, the circuit/module for designating 1326 may determine the type of cyclic period to be used during a particular time interval. For example, if communication is to be switched from one device to another device or if there is a change in a beamforming configuration, a time period associated with zero-CP may be designated; otherwise, a time period associated with regular-CP may be designated. The circuit/module for designating 1326 then sends an indication of the designation to a component of the apparatus 1300 (e.g., the transmitter 1314, the receiver 1316, or the memory device 1308) so that a time interval is designated for the appropriate type of cyclic prefix to be used for a given communication.

The circuit/module for communicating 1328 may include circuitry and/or programming (e.g., code for communicating 1338 stored on the storage medium 1304) adapted to perform several functions relating to, for example, communicating information (e.g., samples). In some implementations, communicating involves receiving information from a component of the apparatus 1300 (e.g., the receiver 1316 or the memory device 1308). In some implementations, communicating involves sending information directly to an ultimate destination (e.g., if the circuit/module for communicating 1328 includes a transmitter) or sending the information to another component of the apparatus 1300 (e.g., the transmitter 1314) for transmission to another device.

As mentioned above, programming stored by the storage medium 1304, when executed by the processing circuit 1310, causes the processing circuit 1310 to perform one or more of the various functions and/or process operations described herein. For example, the programming, when executed by the processing circuit 1310, may cause the processing circuit 1310 to perform the various functions, steps, processes, etc., described herein with respect to FIGS. 1-12 and 14-20 in various implementations. As shown in FIG. 13, the storage medium 1304 may include one or more of the code for transmitting 1330, the code for changing a beamforming configuration 1332, the code for receiving 1334, the code for designating 1336, or the code for communicating 1338.

Example Processes

Figure 14:
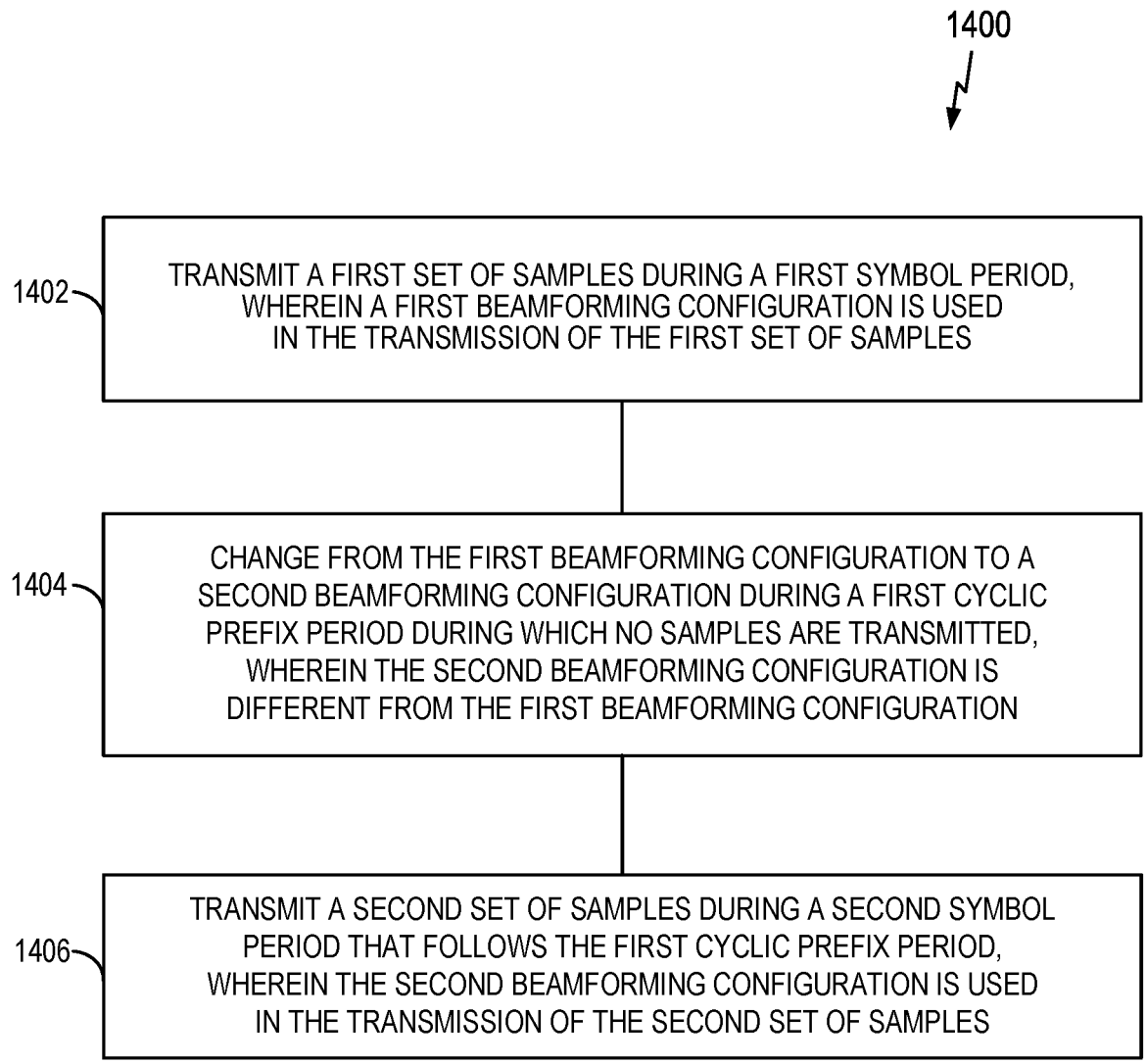
FIG. 14 illustrates an example of a transmit beamforming process in accordance with some aspects of the disclosure.

FIG. 14 illustrates a process 1400 for changing a beamforming configuration in accordance with some aspects of the disclosure. The process 1400 may take place within a processing circuit (e.g., the processing circuit 1310 of FIG. 13), which may be located in a base station, a mobile device, or some other suitable apparatus. Of course, in various aspects within the scope of the disclosure, the process 1400 may be implemented by any suitable apparatus capable of supporting beamforming-related operations.

At block 1402, an apparatus (e.g., a base station, a mobile device, etc.) transmits a first set of samples during a first symbol period. In some aspects, the apparatus may use a first beamforming configuration in the transmission of the first set of samples.

At block 1404, the apparatus changes from the first beamforming configuration to a second beamforming configuration during a first cyclic prefix period. In some aspects, the apparatus does not transmit samples during the first cyclic prefix period. The second beamforming configuration is different from the first beamforming configuration.

In some aspects, the changing of a beamforming configuration includes at least one of: changing a quantity of antennas used for the communicating, changing a phase setting associated with an antenna, or changing a signal amplitude associated with an antenna.

In some aspects, the apparatus makes a determination that a change in a beamforming configuration is indicated. This determination may result in the apparatus electing to use a first type of cyclic prefix (CP) waveform for an initial transmission and use a second type of cyclic prefix (CP) waveform for a subsequent transmission.

At block 1406, the apparatus transmits a second set of samples during a second symbol period that follows (e.g., immediately follows) the first cyclic prefix period. The apparatus uses the second beamforming configuration in the transmission of the second set of samples.

In some scenarios, the apparatus transmits the first set of samples to a first device, and transmits the second set of samples to a second device that is different from the first device.

In some aspects, a symbol period may be a fast Fourier transform (FFT) window.

In some aspects, the transmission of the first set of samples and the transmission of the second set of samples employs orthogonal frequency-division multiplexing (OFDM). In some aspects, the transmission of the first set of samples and the transmission of the second set of samples employs single carrier with cyclic prefix communication.

In some aspects, the transmission of the first set of samples and the transmission of the second set of samples comprises using zero-cyclic prefix (zero-CP) orthogonal frequency-division multiplexing (OFDM) to transmit the samples. In this case, the apparatus may receive other samples that were transmitted using regular-cyclic prefix (regular-CP) orthogonal frequency-division multiplexing (OFDM).

In some aspects, the apparatus may transmit during a second cyclic prefix period that follows the second symbol period, and receive a third set of samples during a third symbol period that follows the second cyclic prefix period.

Figure 15:
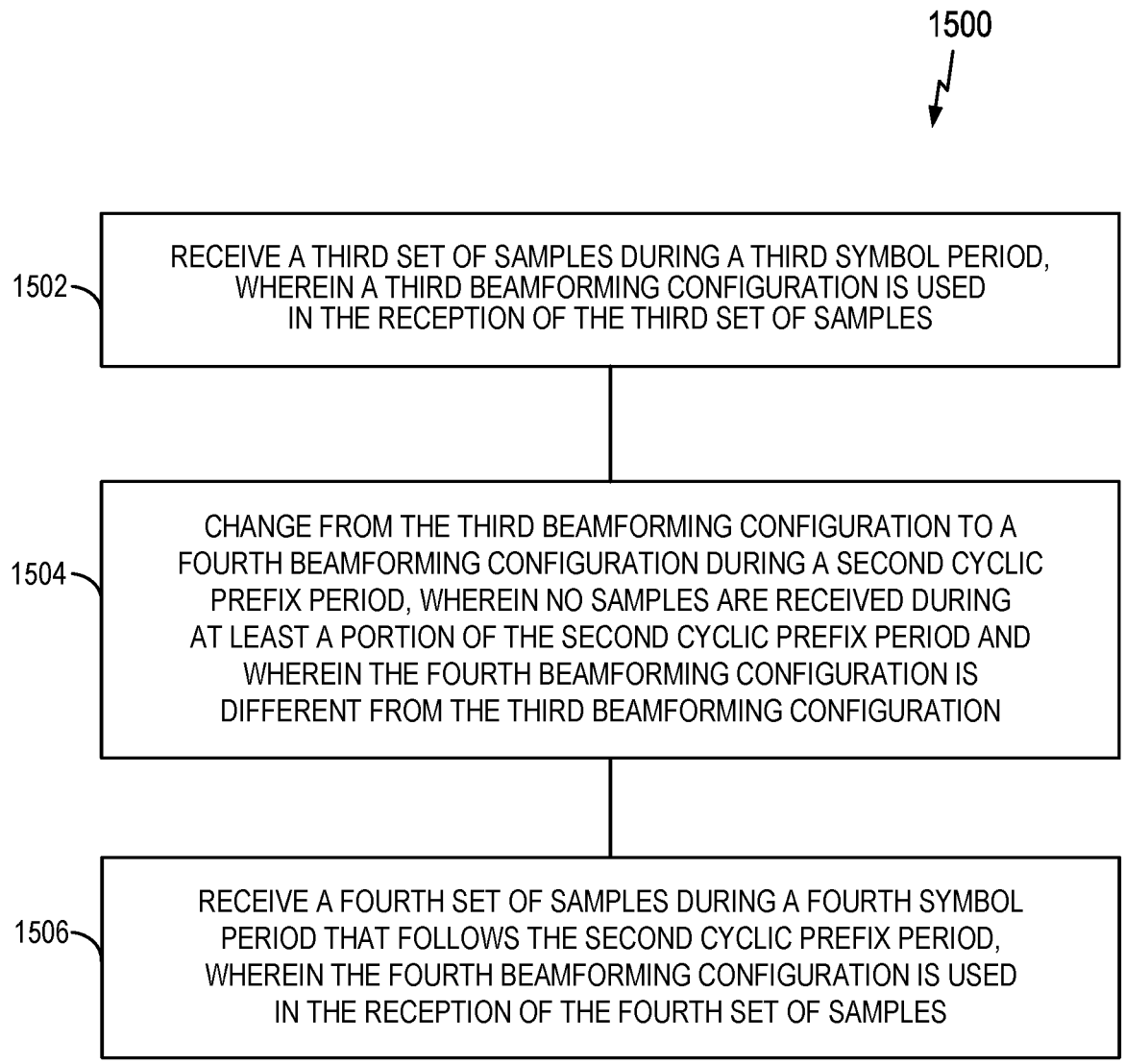
FIG. 15 illustrates an example of a receive beamforming process in accordance with some aspects of the disclosure.

FIG. 15 illustrates a process 1500 for changing a beamforming configuration in accordance with some aspects of the disclosure. In some aspects, the process 1500 may follow the process 1400 of FIG. 14. The process 1500 may take place within a processing circuit (e.g., the processing circuit 1310 of FIG. 13), which may be located in a base station, a mobile device, or some other suitable apparatus. Of course, in various aspects within the scope of the disclosure, the process 1500 may be implemented by any suitable apparatus capable of supporting beamforming-related operations.

At block 1502, an apparatus (e.g., a base station, a mobile device, etc.) receives a third set of samples during a third symbol period. In some aspects, the apparatus uses a third beamforming configuration in the reception of the first set of samples.

At block 1504, the apparatus makes a change from the third beamforming configuration to a fourth beamforming configuration during a second cyclic prefix period. In some aspects, the apparatus does not receive samples during at least a portion of the second cyclic prefix period. The fourth beamforming configuration is different from the third beamforming configuration.

At block 1506, the apparatus receives a fourth set of samples during a fourth symbol period that follows (e.g., immediately follows) the second cyclic prefix period. In some aspects, the apparatus uses the fourth beamforming configuration in the reception of the fourth set of samples.

In some scenarios, the apparatus receives the third set of samples from a first device, and the second set of samples from a second device that is different from the first device.

Figure 16:
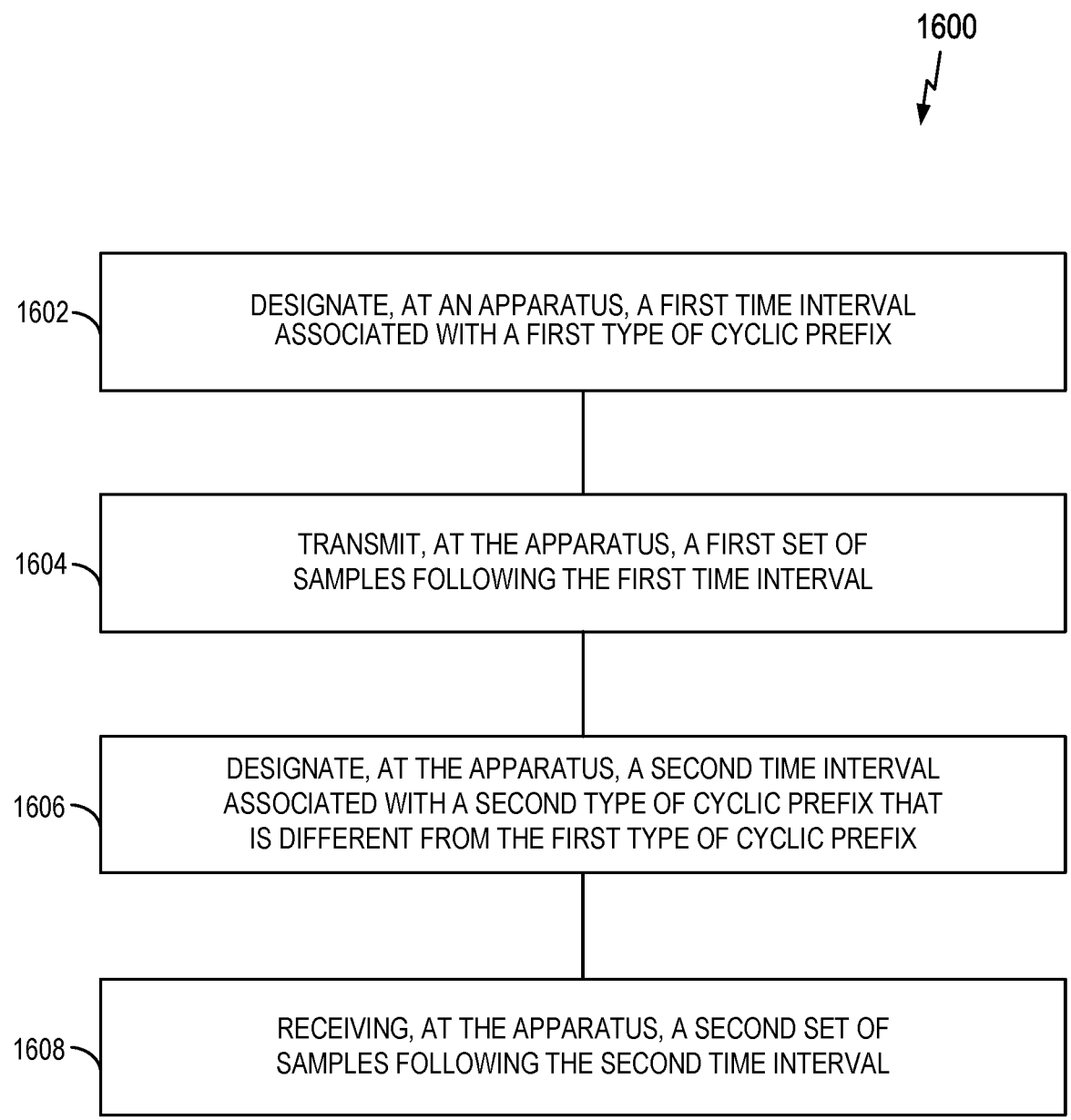
FIG. 16 illustrates an example of transmission and reception using different types of cyclic prefixes in accordance with some aspects of the disclosure.

FIG. 16 illustrates a process 1600 for beamforming-based communication in accordance with some aspects of the disclosure. In some aspects, the process 1600 involves using different CP types for transmission and reception as taught herein. The process 1600 may take place within a processing circuit (e.g., the processing circuit 1310 of FIG. 13), which may be located in a base station, a mobile device, or some other suitable apparatus. Of course, in various aspects within the scope of the disclosure, the process 1600 may be implemented by any suitable apparatus capable of supporting beamforming-related operations.

At block 1602, an apparatus (e.g., a base station, a mobile device, etc.) designates a first time interval associated with a first type of cyclic prefix. For example, the apparatus may identify a first CP period.

At block 1604, the apparatus transmits a first set of samples following (e.g., immediately following) the first time interval. For example, the apparatus may transmit the samples during a first FFT window that follows (e.g., immediately follows) the first CP period.

At block 1606, the apparatus designates a second time interval associated with a second type of cyclic prefix that is different from the first type of cyclic prefix. For example, the apparatus may identify a second CP period.

At block 1608, the apparatus receives a second set of samples following (e.g., immediately following) the second time interval. For example, the apparatus may receive the samples during a second FFT window that follows (e.g., immediately follows) the second CP period.

In some aspects, the first type of cyclic prefix includes a zero-cyclic prefix (zero-CP) and the second type of cyclic prefix includes a regular-cyclic prefix (regular-CP). In some aspects, the communication of the first set of samples and the communication of the second set of samples are performed during a communication time period. In some aspects, the communication time period includes a frame time period. In some aspects, the communication time period includes a quantity of consecutive symbol periods.

Figure 17:
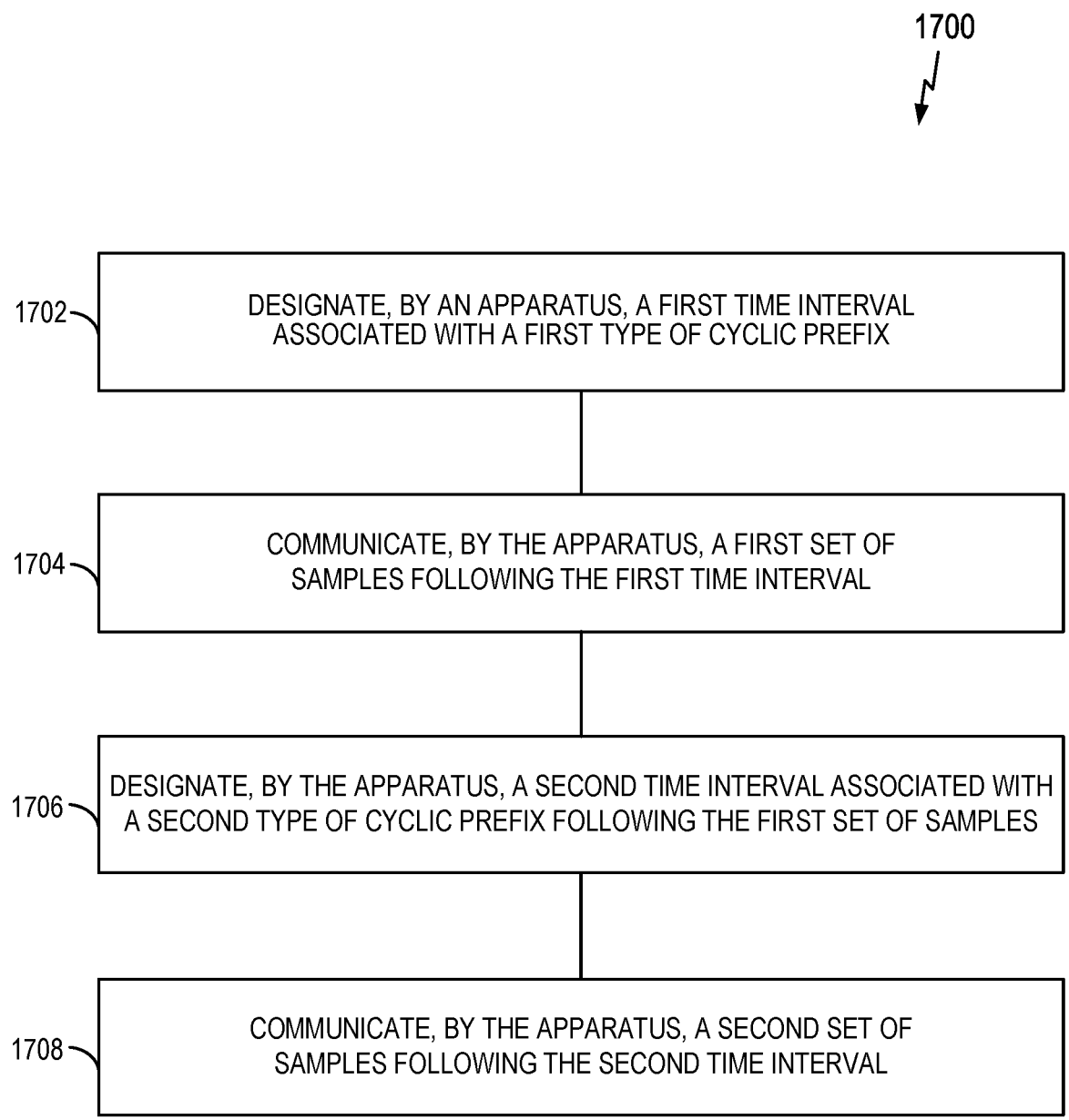
FIG. 17 illustrates an example of a communication using different types of cyclic prefixes in accordance with some aspects of the disclosure.

FIG. 17 illustrates a process 1700 for beamforming-based communication in accordance with some aspects of the disclosure. In some aspects, the process 1700 involves using different CP types for different communications as taught herein. In some aspects, the process 1700 may follow the process 1400 of FIG. 14. The process 1700 may take place within a processing circuit (e.g., the processing circuit 1310 of FIG. 13), which may be located in a base station, a mobile device, or some other suitable apparatus. Of course, in various aspects within the scope of the disclosure, the process 1700 may be implemented by any suitable apparatus capable of supporting beamforming-related operations.

At block 1702, an apparatus (e.g., a base station, a mobile device, etc.) designates a first time interval associated with a first type of cyclic prefix. For example, the apparatus may identify a first CP period.

At block 1704, the apparatus communicates (e.g., transmits or receives) a first set of samples following (e.g., immediately following) the first time interval. For example, the apparatus may communicate the samples during a first FFT window that follows the first CP period. In some aspects, the operations of block 1704 may correspond to the operations of block 1402 of FIG. 14.

At block 1706, the apparatus designates a second time interval associated with a second type of cyclic prefix following the first set of samples. For example, the apparatus may identify a second CP period that follows (e.g., immediately follows) the first FFT window.

At block 1708, the apparatus communicates (e.g., transmits or receives) a second set of samples following (e.g., immediately following) the second time interval. For example, the apparatus may communicate the samples during a second FFT window that follows the second CP period. In some aspects, the operations of block 1708 may correspond to the operations of block 1406 of FIG. 14.

In some aspects, the first type of cyclic prefix includes a zero-cyclic prefix (zero-CP) and the second type of cyclic prefix includes a regular-cyclic prefix (regular-CP). In some aspects, the communication of the first set of samples and the communication of the second set of samples are performed during a communication time period. In some aspects, the communication time period includes a frame time period. In some aspects, the communication time period includes a quantity of consecutive symbol periods.

In some aspects, the communication of samples includes transmitting samples and/or receiving samples. In some aspects, the communication of samples employs single carrier with cyclic prefix communication. In some aspects, the communication of samples employs orthogonal frequency-division multiplexing (OFDM).

In some aspects, the communication of samples includes using zero-cyclic prefix (zero-CP) orthogonal frequency-division multiplexing (OFDM) to transmit the samples. In this case, other samples that were transmitted using regular-cyclic prefix (regular-CP) orthogonal frequency-division multiplexing (OFDM) may be received.

In some aspects, the communication of samples includes receiving samples that were transmitting using regular-cyclic prefix (regular-CP) orthogonal frequency-division multiplexing (OFDM). In this case, other samples may be transmitted using zero-cyclic prefix (zero-CP) orthogonal frequency-division multiplexing (OFDM).

In some aspects, the apparatus communicates a third set of samples prior to the first time interval, wherein the first time interval commences at an end of the third set of samples and ends at a beginning of the first set of samples, and wherein the apparatus does not communicate samples during the first time interval.

Figure 18:
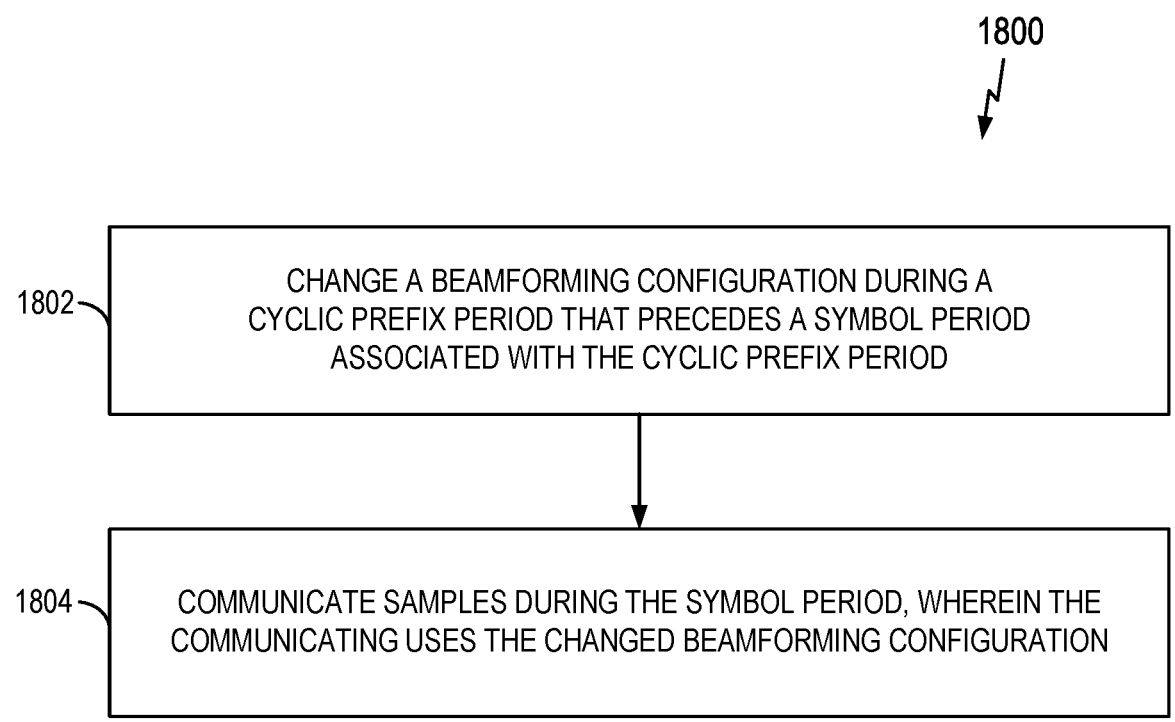
FIG. 18 illustrates an example of communication involving changing a beamforming configuration in accordance with some aspects of the disclosure.

FIG. 18 illustrates a process 1800 for changing a beamforming configuration during a CP period in accordance with some aspects of the disclosure. The process 1800 may take place within a processing circuit (e.g., the processing circuit 1310 of FIG. 13), which may be located in a base station, a mobile device, or some other suitable apparatus. Of course, in various aspects within the scope of the disclosure, the process 1800 may be implemented by any suitable apparatus capable of supporting beamforming-related operations.

At block 1802, an apparatus (e.g., a base station, a mobile device, etc.) changes a beamforming configuration during a cyclic prefix period that precedes a symbol period associated with the cyclic prefix period. In some aspects, the operations of block 1802 may correspond to the operations of block 1404 of FIG. 14. In some aspects, the operations of block 1802 may correspond to the operations of block 1504 of FIG. 15.

At block 1804, samples are communicated during the symbol period. This communicating uses the changed beamforming configuration from block 1802. In some aspects, the operations of block 1804 may correspond to the operations of block 1406 of FIG. 14. In some aspects, the operations of block 1804 may correspond to the operations of block 1506 of FIG. 15.

Figure 19:
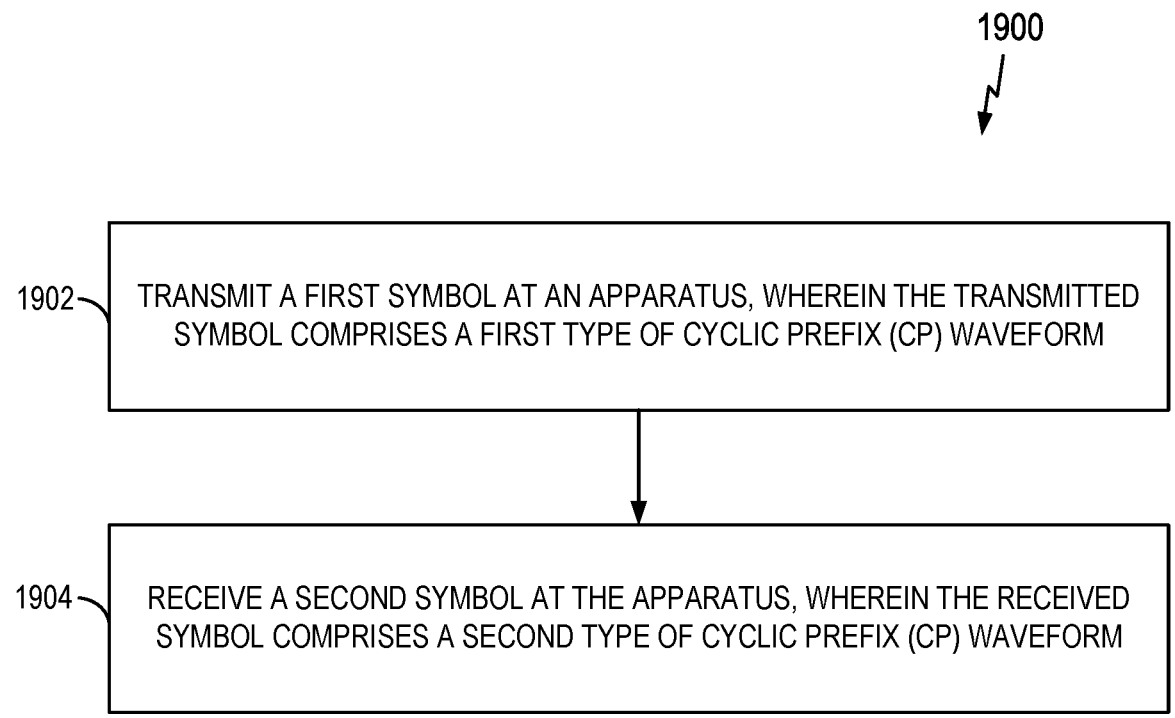
FIG. 19 illustrates an example of transmission and reception using different types of cyclic prefixes in accordance with some aspects of the disclosure.

FIG. 19 illustrates a process 1900 for beamforming-based communication in accordance with some aspects of the disclosure. In some aspects, the process 1900 involves using different CP types for transmission and reception as taught herein. The process 1900 may take place within a processing circuit (e.g., the processing circuit 1310 of FIG. 13), which may be located in a base station, a mobile device, or some other suitable apparatus. Of course, in various aspects within the scope of the disclosure, the process 1900 may be implemented by any suitable apparatus capable of supporting beamforming-related operations.

At block 1902, a first symbol is transmitted at (i.e., by) an apparatus. The transmitted symbol includes a first type of cyclic prefix (CP) waveform.

At block 1904, a second symbol is received at the apparatus. The received symbol includes a second type of cyclic prefix (CP) waveform.

In some aspects, the first type of cyclic prefix (CP) waveform includes a zero-cyclic prefix (zero-CP) waveform and the second type of cyclic prefix (CP) waveform includes a regular-cyclic prefix (regular-CP) waveform. In some aspects, the first type of cyclic prefix (CP) waveform includes a regular-cyclic prefix (regular-CP) waveform and the second type of cyclic prefix (CP) waveform includes a zero-cyclic prefix (zero-CP) waveform.

In some aspects, the transmission and reception employs orthogonal frequency-division multiplexing (OFDM). In some aspects, the transmission and reception employs single carrier with cyclic prefix communication.

In some aspects, a determination is made that a change in a beamforming configuration is indicated. This determination may then trigger the use of the first type of cyclic prefix (CP) waveform for transmission and the use of the second type of cyclic prefix (CP) waveform for reception.

Figure 20:
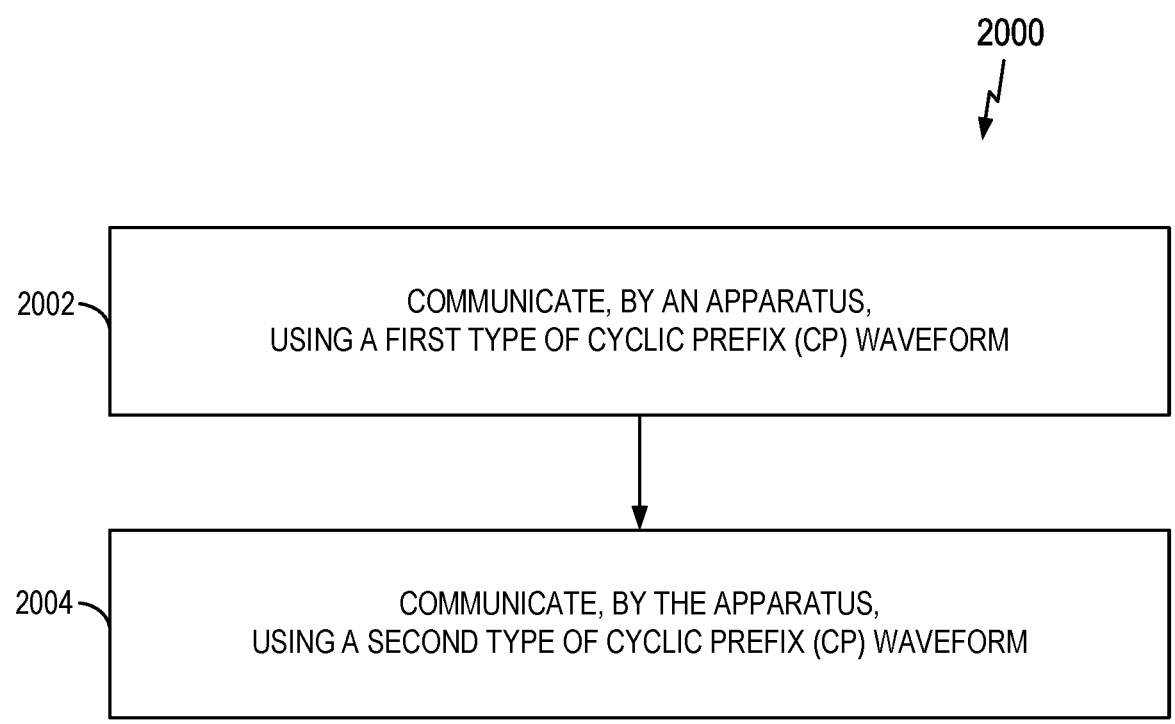
FIG. 20 illustrates an example of communication using different types of cyclic prefixes in accordance with some aspects of the disclosure.

FIG. 20 illustrates a process 2000 for beamforming-based communication in accordance with some aspects of the disclosure. In some aspects, the process 2000 involves using different CP types for different communications as taught herein. The process 2000 may take place within a processing circuit (e.g., the processing circuit 1310 of FIG. 13), which may be located in a base station, a mobile device, or some other suitable apparatus. Of course, in various aspects within the scope of the disclosure, the process 2000 may be implemented by any suitable apparatus capable of supporting beamforming-related operations.

At block 2002, an apparatus (e.g., a base station, a mobile device, etc.) communicates using a first type of cyclic prefix (CP) waveform.

At block 2004, the apparatus communicates using a second type of cyclic prefix (CP) waveform.

In some aspects, the communication using the first type of cyclic prefix (CP) waveform and the communication using the second type of cyclic prefix (CP) waveform are performed during a communication time period. In some aspects, the communication time period includes a frame time period. In some aspects, the communication time period includes a quantity of consecutive symbol periods.

In some aspects, the communication employs orthogonal frequency-division multiplexing (OFDM). In some aspects, the communication employs single carrier with cyclic prefix communication.

In some aspects, the apparatus determines that a change in a beamforming configuration is indicated. This determination may result in the apparatus electing to use the first type of cyclic prefix (CP) waveform for an initial transmission and use the second type of cyclic prefix (CP) waveform for a subsequent transmission.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" or "one or more of" a list of items refers to any combination of those items, including single members. As an example, "at least one of: a, b, or c" is intended to cover: a; b; c; a and b; a and c; b and c; a, b and c; 2a; 2b; 2c; 2a and $b$; a and 2b, 2a and 2b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. An apparatus for communication, comprising:
a receiver configured to receive a series of consecutive symbols during a communication period comprising a first cyclic prefix period, a first symbol period that follows the first cyclic prefix period, a second cyclic prefix period that follows the first symbol period, and a second symbol period that follows the second cyclic prefix period, the series of consecutive symbols including a first symbol in the first symbol period and a second symbol in the second symbol period; and
a processing circuit configured to:
process the first symbol based on a first type of cyclic prefix associated with the first cyclic prefix period, wherein the first cyclic prefix period does not include information from the first symbol period, and
process the second symbol based on a second type of cycle prefix associated with the second cyclic prefix period, wherein the second type of cyclic prefix is different from the first type of cyclic prefix whereby the second cyclic prefix period includes information from the second symbol period.

2. The apparatus of claim 1, wherein the first cyclic prefix period is at a beginning of the series of consecutive symbols.

3. The apparatus of claim 1, wherein the first cyclic prefix period is at a beginning of the communication time period.

4. The apparatus of claim 3, wherein the communication time period comprises a frame for the series of consecutive symbols.

5. The apparatus of claim 1, wherein the processing of the first symbol comprises:
reconstructing samples for the first cyclic prefix period; and
processing samples of the first symbol and the reconstructed samples.

6. The apparatus of claim 5, wherein the processing of the second symbol comprises:
processing samples of the second symbol and samples of the second cyclic prefix period.

7. The apparatus of claim 1, wherein:
the first type of cyclic prefix comprises a zero-cyclic prefix (zero-CP); and
the second type of cyclic prefix comprises a regular-cyclic prefix (regular-CP).

8. The apparatus of claim 1, wherein the processing circuit is further configured to:
determine the first type of cyclic prefix; and
determine the second type of cyclic prefix.

9. The apparatus of claim 8, wherein:
the receiver is further configured to receive a message; and
the determination of the first type of cyclic prefix and the determination of the second type of cyclic prefix are based on the message.

10. The apparatus of claim 8, wherein the determination of the first type of cyclic prefix and the determination of the second type of cyclic prefix are based on a structure of a frame for the series of consecutive symbols.

11. The apparatus of claim 8, wherein:
the determination of the first type of cyclic prefix is based on timing of the first symbol; and
the determination of the second type of cyclic prefix is based on timing of the second symbol.

12. The apparatus of claim 8, wherein the determination of the first type of cyclic prefix is based on a boundary.

13. The apparatus of claim 12, wherein the boundary comprises a boundary of a frame for the series of consecutive symbols.

14. The apparatus of claim 12, wherein the boundary comprises a boundary of a beacon.

15. The apparatus of claim 8, wherein:
the apparatus further comprises a memory device; and
the determination of the first type of cyclic prefix and the determination of the second type of cyclic prefix are based on a configuration stored in the memory device.

16. The apparatus of claim 1, wherein the series of consecutive symbols are received during a communication frame.

17. The apparatus of claim 1, wherein the processing circuit is further configured to:
change from a first beamforming configuration to a second beamforming configuration during the second cyclic prefix period.

18. The apparatus of claim 17, wherein the processing circuit is further configured to change from the first beamforming configuration to the second beamforming configuration due to: a switch from communicating with the first device to communicating with the second device, a change in a channel condition, movement of the apparatus, or any combination thereof.

19. A method of communication for an apparatus, comprising:
receiving a series of consecutive symbols during a communication period comprising a first cyclic prefix period, a first symbol period that follows the first cyclic prefix period, a second cyclic prefix period that follows the first symbol period, and a second symbol period that follows the second cyclic prefix period, the series of consecutive symbols including a first symbol in the first symbol period and a second symbol in the second symbol period;
processing the first symbol based on a first type of cyclic prefix associated with the first cyclic prefix period, wherein the first cyclic prefix period does not include information from the first symbol period; and
processing the second symbol based on a second type of cycle prefix associated with the second cyclic prefix period, wherein the second type of cyclic prefix is different from the first type of cyclic prefix whereby the second cyclic prefix period includes information from the second symbol period.

20. The method of claim 19, wherein the first cyclic prefix period is at a beginning of the series of consecutive symbols.

21. The method of claim 19, wherein the processing of the first symbol comprises:
reconstructing samples for the first cyclic prefix period; and
processing samples of the first symbol and the reconstructed samples.

22. The method of claim 21, wherein the processing of the second symbol comprises:
processing samples of the second symbol and samples of the second cyclic prefix period.

23. The method of claim 19, further comprising:
determining the first type of cyclic prefix; and
determining the second type of cyclic prefix.

24. The method of claim 23, wherein:
the process further comprises receiving a message; and
the determination of the first type of cyclic prefix and the determination of the second type of cyclic prefix are based on the message.

25. The method of claim 19, wherein the series of consecutive symbols are received during a communication frame.

26. The method of claim 19, further comprising:
changing from a first beamforming configuration to a second beamforming configuration during the second cyclic prefix period.

27. The method of claim 26, wherein the changing from the first beamforming configuration to the second beamforming configuration is due to: a switch from communicating with the first device to communicating with the second device, a change in a channel condition, movement of the apparatus, or any combination thereof.

28. An apparatus for communication, comprising:
means for receiving a series of consecutive symbols during a communication period comprising a first cyclic prefix period, a first symbol period that follows the first cyclic prefix period, a second cyclic prefix period that follows the first symbol period, and a second symbol period that follows the second cyclic prefix period, the series of consecutive symbols including a first symbol in the first symbol period and a second symbol in the second symbol period;
means for processing the first symbol based on a first type of cyclic prefix associated with the first cyclic prefix period, wherein the first cyclic prefix period does not include information from the first symbol period; and
means for processing the second symbol based on a second type of cycle prefix associated with the second cyclic prefix period, wherein the second type of cyclic prefix is different from the first type of cyclic prefix whereby the second cyclic prefix period includes information from the second symbol period.

29. The apparatus of claim 28, wherein the processing of the first symbol comprises:
reconstructing samples for the first cyclic prefix period; and
processing samples of the first symbol and the reconstructed samples.

30. The apparatus of claim 29, wherein the processing of the second symbol comprises:
processing samples of the second symbol and samples of the second cyclic prefix period.

31. The apparatus of claim 28, further comprising:
means for determining the first type of cyclic prefix and the second type of cyclic prefix.

32. The apparatus of claim 31, wherein:
the means for receiving is configured to receive a message; and
the determination of the first type of cyclic prefix and the determination of the second type of cyclic prefix are based on the message.

33. The apparatus of claim 28, further comprising:
means for changing from a first beamforming configuration to a second beamforming configuration during the second cyclic prefix period.

34. A non-transitory computer-readable medium storing computer-executable code, including code to:
receive a series of consecutive symbols during a communication period comprising a first cyclic prefix period, a first symbol period that follows the first cyclic prefix period, a second cyclic prefix period that follows the first symbol period, and a second symbol period that follows the second cyclic prefix period, the series of consecutive symbols including a first symbol in the first symbol period and a second symbol in the second symbol period;
process the first symbol based on a first type of cyclic prefix associated with the first cyclic prefix period, wherein the first cyclic prefix period does not include information from the first symbol period; and
process the second symbol based on a second type of cycle prefix associated with the second cyclic prefix period, wherein the second type of cyclic prefix is different from the first type of cyclic prefix whereby the second cyclic prefix period includes information from the second symbol period.

35. An apparatus for communication, comprising:
a processing circuit configured to:
generate a first symbol with a first type of cyclic prefix, and
generate a second symbol with a second type of cycle prefix, wherein the second type of cyclic prefix is different from the first type of cyclic prefix; and
a transmitter configured to transmit a series of consecutive symbols including the first symbol and the second symbol during a communication period comprising a first cyclic prefix period for the first type of cyclic prefix, a first symbol period that follows the first cyclic prefix period for the first symbol, a second cyclic prefix period that follows the first symbol period for the second type of cyclic prefix, and a second symbol period that follows the second cyclic prefix period for the second symbol, the series of consecutive symbols,
wherein, based on the first type of cyclic prefix, the generation of the first symbol comprises not including information from the first symbol period in the first cyclic prefix period, and
wherein, based on the second type of cyclic prefix, the generation of the second symbol comprises including information from the second symbol period in the second cyclic prefix period.

36. The apparatus of claim 35, wherein the processing circuit is further configured to:
locate the first cyclic prefix period at a beginning of the series of consecutive symbols.

37. The apparatus of claim 35, wherein the processing circuit is further configured to:
locate the first cyclic prefix period at a beginning of a frame for the series of consecutive symbols.

38. The apparatus of claim 35, wherein:
the transmitter is further configured to transmit a message; and
the message indicates timing of the first type of cyclic prefix and timing of the second type of cyclic prefix.

39. The apparatus of claim 35, wherein:
the transmitter is further configured to transmit a message; and
the message indicates the first type of cyclic prefix and the second type of cyclic prefix.

40. A method of communication for an apparatus, comprising:
generating a first symbol with a first type of cyclic prefix;
generating a second symbol with a second type of cycle prefix, wherein the second type of cyclic prefix is different from the first type of cyclic prefix; and
transmitting a series of consecutive symbols including the first symbol and the second symbol during a communication period comprising a first cyclic prefix period for the first type of cyclic prefix, a first symbol period that follows the first cyclic prefix period for the first symbol, a second cyclic prefix period that follows the first symbol period for the second type of cyclic prefix, and a second symbol period that follows the second cyclic prefix period for the second symbol, the series of consecutive symbols, wherein, based on the first type of cyclic prefix, the generation of the first symbol comprises not including information from the first symbol period in the first cyclic prefix period, and wherein, based on the second type of cyclic prefix, the generation of the second symbol comprises including information from the second symbol period in the second cyclic prefix period.

41. The method of claim 40, further comprising:
locating the first cyclic prefix period at a beginning of the series of consecutive symbols.

42. The method of claim 40, further comprising:
locating the first cyclic prefix period at a beginning of a frame for the series of consecutive symbols.

43. The method of claim 40, wherein:
the method further comprises transmitting a message; and
the message indicates timing of the first type of cyclic prefix and timing of the second type of cyclic prefix.

44. The method of claim 40, wherein:
the method further comprises transmitting a message; and
the message indicates the first type of cyclic prefix and the second type of cyclic prefix.

45. An apparatus for communication, comprising:
means for generating a first symbol with a first type of cyclic prefix;
means for generating a second symbol with a second type of cycle prefix, wherein the second type of cyclic prefix is different from the first type of cyclic prefix; and
means for transmitting a series of consecutive symbols including the first symbol and the second symbol during a communication period comprising a first cyclic prefix period for the first type of cyclic prefix, a first symbol period that follows the first cyclic prefix period for the first symbol, a second cyclic prefix period that follows the first symbol period for the second type of cyclic prefix, and a second symbol period that follows the second cyclic prefix period for the second symbol, the series of consecutive symbols, wherein, based on the first type of cyclic prefix, the generation of the first symbol comprises not including information from the first symbol period in the first cyclic prefix period, and wherein, based on the second type of cyclic prefix, the generation of the second symbol comprises including information from the second symbol period in the second cyclic prefix period.

46. The apparatus of claim 45, wherein the means for generating the first symbol is configured to locate the first cyclic prefix period at a beginning of the series of consecutive symbols.

47. The apparatus of claim 45, wherein the means for generating the first symbol is configured to locate the first cyclic prefix period at a beginning of a frame for the series of consecutive symbols.

48. The apparatus of claim 45, wherein:
the means for transmitting is configured to transmit a message; and
the message indicates timing of the first type of cyclic prefix and timing of the second type of cyclic prefix.

49. The apparatus of claim 45, wherein:
the means for transmitting is configured to transmit a message; and
the message indicates the first type of cyclic prefix and the second type of cyclic prefix.

50. A non-transitory computer-readable medium storing computer-executable code, including code to:
generate a first symbol with a first type of cyclic prefix;
generate a second symbol with a second type of cycle prefix, wherein the second type of cyclic prefix is different from the first type of cyclic prefix; and
transmit a series of consecutive symbols including the first symbol and the second symbol during a communication period comprising a first cyclic prefix period for the first type of cyclic prefix, a first symbol period that follows the first cyclic prefix period for the first symbol, a second cyclic prefix period that follows the first symbol period for the second type of cyclic prefix, and a second symbol period that follows the second cyclic prefix period for the second symbol, the series of consecutive symbols, wherein, based on the first type of cyclic prefix, the generation of the first symbol comprises not including information from the first symbol period in the first cyclic prefix period, and wherein, based on the second type of cyclic prefix, the generation of the second symbol comprises including information from the second symbol period in the second cyclic prefix period.

* * * * *